(12) United States Patent
Campbell et al.

(10) Patent No.: US 12,546,107 B2
(45) Date of Patent: Feb. 10, 2026

(54) COMPRESSION FRAMING SYSTEM

(71) Applicant: Riot Glass, LLC, Huntington Beach, CA (US)

(72) Inventors: Brad Campbell, Fountain Valley, CA (US); Terry Green, Anaheim, CA (US)

(*) Notice: Subject to any disclaimer, the term of this patent is extended or adjusted under 35 U.S.C. 154(b) by 448 days.

(21) Appl. No.: 18/173,601

(22) Filed: Feb. 23, 2023

(65) Prior Publication Data

US 2023/0392370 A1 Dec. 7, 2023

Related U.S. Application Data

(60) Provisional application No. 63/366,005, filed on Jun. 7, 2022.

(30) Foreign Application Priority Data

Dec. 16, 2022 (CA) ...................................... 3184181

(51) Int. Cl.
*E04B 1/92* (2006.01)
*E06B 1/60* (2006.01)
(Continued)

(52) U.S. Cl.
CPC ................ *E04B 1/92* (2013.01); *E06B 5/106* (2013.01); *E06B 5/11* (2013.01)

(58) Field of Classification Search
CPC . E04B 1/92; E04B 1/98; E04B 2/7459; E04B 2002/749; E04B 2002/7492;
(Continued)

(56) References Cited

U.S. PATENT DOCUMENTS 670,585 A * 3/1901 Fowler .................. A47H 1/022
248/200.1
914,876 A * 3/1909 Phinney ................. A47H 1/022
211/105.4
(Continued)

FOREIGN PATENT DOCUMENTS

GB 2194276 A * 3/1988 ............ E06B 5/025
KR 20180058500 A * 6/2018 ............ E04G 21/30

*Primary Examiner* — Ryan D Kwiecinski
(74) *Attorney, Agent, or Firm* — CIONCA IP LAW P.C.

(57) ABSTRACT

A compression framing system configured to engage with opposing mounting surfaces, the compression framing system having a compression frame, the compression frame having: a first compression arm and a second compression arm, each compression arm having: a hollow pipe body; and a friction shoe associated with the hollow pipe body, said friction shoe being configured to engage directly with the mounting surface; an inner support beam configured to secure the first compression arm to the second compression arm; and an expansion controller associated with the hollow pipe body of the first compression arm; wherein the expansion controller is configured to selectively adjust a separation distance between the friction shoe of the first compression arm and the friction shoe of the second compression arm. The compression framing system is configured to provide a mounting structure frictionally engaged with opposing mounting surfaces for non-destructive attachment of a protective structure.

19 Claims, 13 Drawing Sheets

(51) Int. Cl.
*E06B 5/10* (2006.01)
*E06B 5/11* (2006.01)

(58) Field of Classification Search
CPC ...... E04B 2002/7494; E06B 1/12; E06B 1/36; E06B 1/60; E06B 1/6069; E06B 1/6076; E06B 5/025; E06B 5/106; E06B 5/11; E06B 2009/002; E04G 25/02; E04G 25/04; A47H 1/022
USPC ..... 52/111, 121, 291, 632; 211/87.01, 88.02, 211/89.01, 105.3, 105.4
See application file for complete search history.

(56) References Cited

U.S. PATENT DOCUMENTS

| | | | | |
|---|---|---|---|---|
| 2,293,168 A * | 8/1942 | Pirone | ................... | A47H 1/022 211/105.4 |
| 3,854,264 A * | 12/1974 | Thomassen | ............. | E04B 2/822 52/632 |
| 3,880,394 A * | 4/1975 | Wisecarver | ........... | E04G 25/065 410/151 |
| 4,473,331 A * | 9/1984 | Wisecarver | ............... | B60P 7/15 410/151 |
| 5,688,087 A * | 11/1997 | Stapleton | ................. | B60P 7/15 410/150 |
| 5,934,631 A * | 8/1999 | Becker | ................... | H02G 3/125 248/200.1 |
| 6,233,877 B1 * | 5/2001 | Monroe | ................... | A62B 1/04 248/200.1 |
| 9,066,637 B2 * | 6/2015 | Zeng | ........................ | A47K 3/38 |
| 10,611,292 B2 * | 4/2020 | Kanczuzewski | .......... | B60P 7/15 |
| 10,683,699 B2 * | 6/2020 | Wang | ........................ | E06B 9/04 |
| 11,162,267 B1 * | 11/2021 | Santini | ..................... | E04G 5/08 |
| 11,330,904 B2 * | 5/2022 | Khaliq | ................... | A47B 57/48 |
| 11,732,508 B1 * | 8/2023 | Salvesen | ................ | E06B 9/063 292/262 |
| 2017/0332818 A1 * | 11/2017 | Jones | ..................... | A47H 1/022 |

* cited by examiner

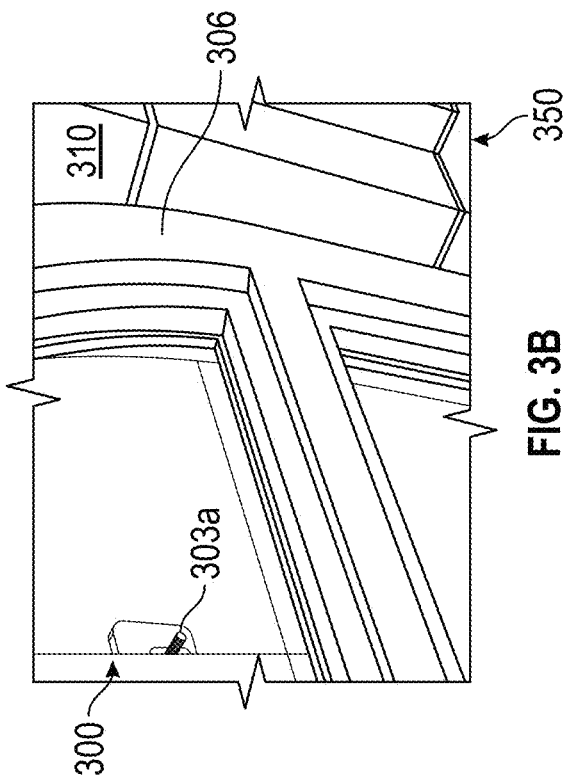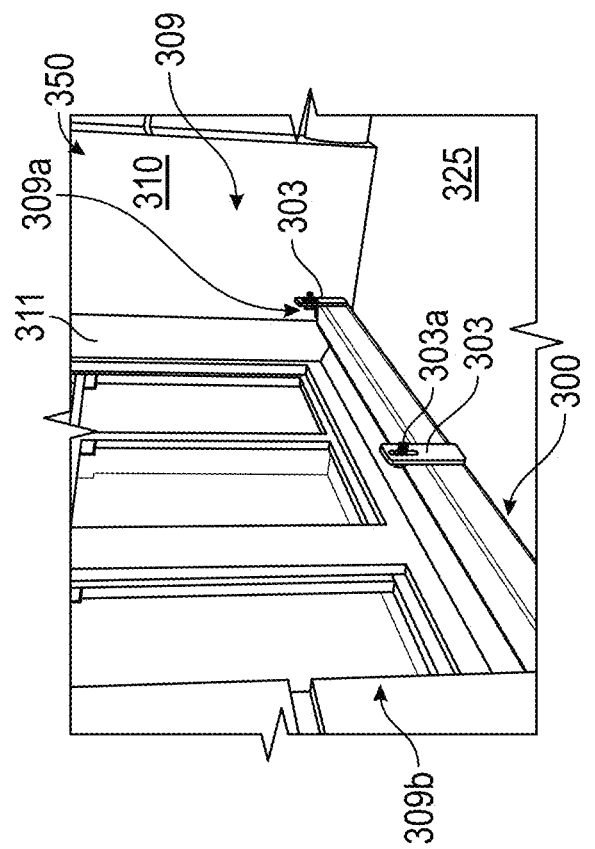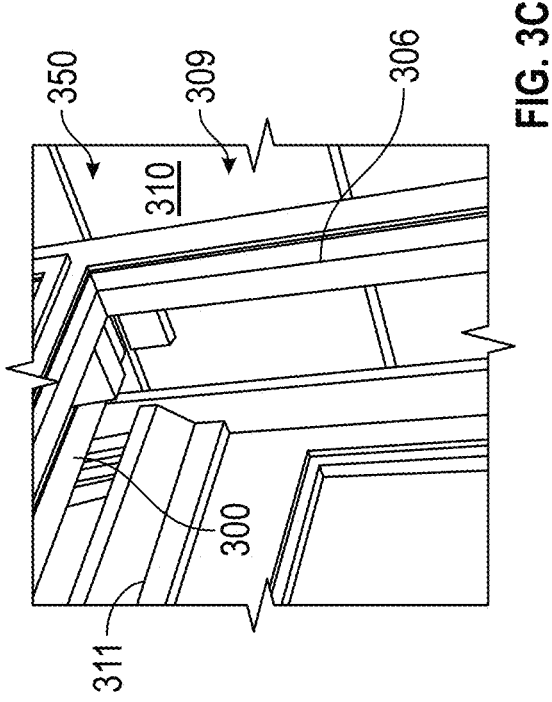

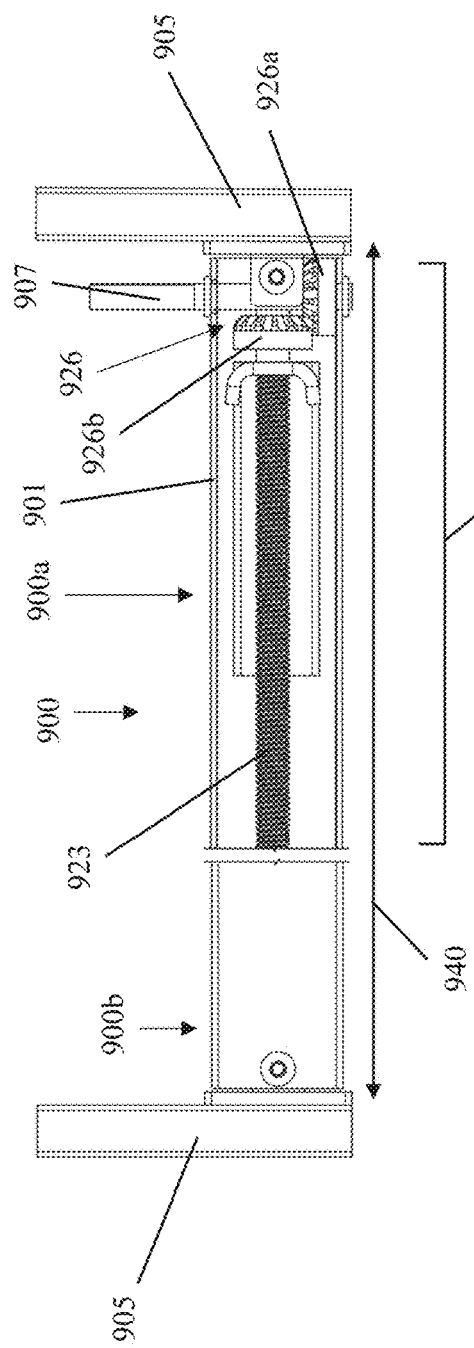
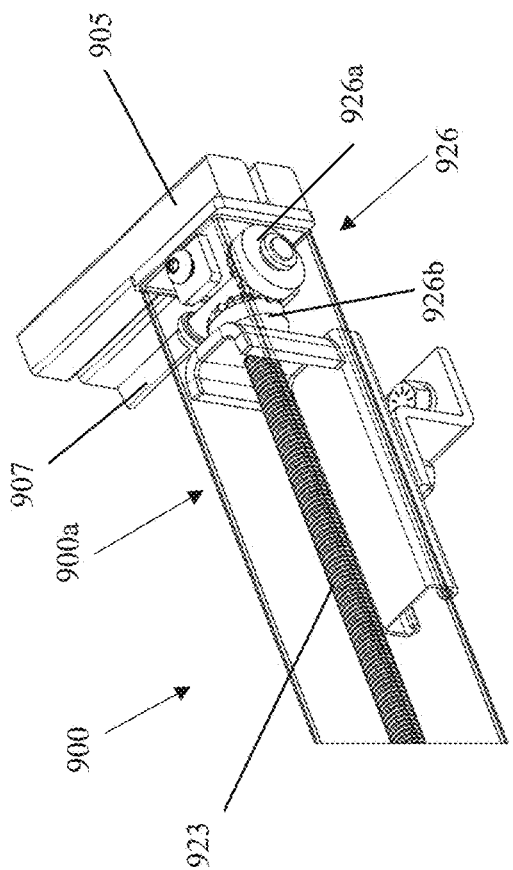
FIG. 9A
FIG. 9B

COMPRESSION FRAMING SYSTEM

CROSS-REFERENCE TO RELATED APPLICATIONS

This application claims priority to Canadian Application No. 3,184,181, filed Dec. 16, 2022, which claims priority to U.S. Provisional Application No. 63/366,005, filed Jun. 7, 2022, both of which are hereby incorporated by reference, to the extent that they are not conflicting with the present application.

BACKGROUND OF INVENTION

1. Field of the Invention

The invention relates generally to protective structure framing technologies and specifically to compression framing systems for protective structures.

2. Description of the Related Art

Many historic buildings, such as the Elbert P. Tuttle Building of Atlanta, Georgia, are clad in granite blocks, other stone blocks, or other comparable historic building materials. While these historic building materials may help to maintain a desired visual aesthetic for such structures, said materials may present unique challenges when attempting to outfit a historic building with suitable protection against forced entry attempts. The external surfaces of these historic building may be broken, marked up, marred or otherwise damaged when attempting to utilize know security measure attachment methods, such as drilling, heavy adhesives, etc. In addition to preventing forced entries, preserving the delicate and historical architecture of these buildings may be of great importance. The currently known and widely utilized methods and devices for retrofitting security windows onto historic buildings are incapable of preventing forced entry without doing so at the expense of the external cladding structure/external surface of said historic building.

Therefore, there is a need to solve the problems described above by providing a framing system for a security glass window that does not penetrate or otherwise damage the surrounding mounting surface.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a compression framing system configured to engage with opposing mounting surfaces of a building opening is provided, the compression framing system having at least one compression frame, each compression frame comprising: a first compression arm and a second compression arm, each compression arm having: a hollow pipe body having an inner body end and an outer body end; a connection bracket secured to the hollow pipe body; and a friction shoe configured to engage with the outer body end of the hollow pipe body, the friction shoe being further configured to engage directly with a corresponding opposing mounting surface of the opposing mounting surfaces; an inner support beam configured to be at least partially nested within the inner body end of the first compression arm and the inner body end of the second compression arm to secure the first compression arm to the second compression arm; and an expansion controller associated with the hollow pipe body of the first compression arm; wherein the expansion controller is configured to selectively adjust a separation distance between the friction shoe of the first compression arm and the friction shoe of the second compression arm; wherein each connection bracket is configured to engage with a protective structure to secure the protective structure to the opposing mounting surfaces, wherein the protective structure is configured to secure the building opening. Thus, an advantage is that the compression framing system may provide a mounting structure for securing a protective structure to be attached to a building without penetrating or damaging the surrounding mounting surface. Another advantage is the compression framing system may be easily installed, serviced, repaired, and maintained using standard tools. Another advantage is that the expansion force exerted by each compression frame of the compression framing system may be selectively tuned using the disclosed expansion controller based on the strength of the surrounding mounting surface and the desired level of protection. Another advantage is that forced entry attempts may be protected against without damaging the surrounding mounting surface. Another advantage is that the compression framing system may be retrofitted over an existing window, such that said compression framing system is disposed between the existing window and a protective structure, thus being inherently tamper proof due to only being accessible from the internal environment, without utilizing tamper-proof hardware. Another advantage is that each friction shoes may be configured to selectively pivot or rotate to be parallel with the mounting surface, thus allowing for the secure engagement of each friction shoe with the mounting surface.

In another aspect, a compression framing system configured to engage with opposing mounting surfaces of a building opening is provided, the compression framing system having at least one compression frame, each compression frame comprising: a first compression arm and a second compression arm, each compression arm having: a hollow pipe body; a connection bracket secured to the hollow pipe body; and a friction shoe configured to pivotally engage with the hollow pipe body, the friction shoe being further configured to engage directly with a corresponding opposing mounting surface of the opposing mounting surfaces, wherein the pivotal engagement of the friction shoe with the hollow pipe body allows the friction shoe to be selectively rotated; an inner support beam configured to secure the first compression arm to the second compression arm; and an expansion controller associated with the hollow pipe body of the first compression arm; wherein the expansion controller is configured to selectively adjust a separation distance between the friction shoe of the first compression arm and the friction shoe of the second compression arm; wherein each connection bracket is configured to engage with a protective structure to secure the protective structure to the opposing mounting surfaces, wherein the protective structure is configured to secure the building opening. Again, an advantage is that the compression framing system may provide a mounting structure for securing a protective structure to be attached to a building without penetrating or damaging the surrounding mounting surface. Another advantage is the compression framing system may be easily installed, serviced, repaired, and maintained using standard tools. Another advantage is that the expansion force exerted by each compression frame of the compression framing system may be selectively tuned using the disclosed expansion controller based on the strength of the surrounding mounting surface and the desired level of protection. Another advantage is that forced entry attempts may be protected against without damaging the surrounding mounting surface. Another advantage is that the compression framing system may be retrofitted over an existing window, such that said compression framing system is disposed between the existing window and a protective structure, thus being inherently tamper proof due to only being accessible from the internal environment, without utilizing tamper-proof hardware. Another advantage is that each friction shoes may be configured to selectively pivot or rotate to be parallel with the mounting surface, thus allowing for the secure engagement of each friction shoe with the mounting surface In another aspect, a compression framing system configured to engage with opposing mounting surfaces of a building opening is provided, the compression framing system having at least one compression frame, each compression frame comprising: a first compression arm and a second compression arm, each compression arm having: a hollow pipe body; a connection bracket secured to the hollow pipe body; and a friction shoe associated with the hollow pipe body, the friction shoe being configured to engage directly with a corresponding opposing mounting surface of the opposing mounting surfaces; an inner support beam configured to secure the first compression arm to the second compression arm; and an expansion controller associated with the hollow pipe body of the first compression arm; wherein the expansion controller is configured to selectively adjust a separation distance between the friction shoe of the first compression arm and the friction shoe of the second compression arm; wherein each connection bracket is configured to engage with a protective structure to secure the protective structure to the opposing mounting surfaces, wherein the protective structure is configured to secure the building opening. Again, an advantage is that the compression framing system may provide a mounting structure for securing a protective structure to be attached to a building without penetrating or damaging the surrounding mounting surface. Another advantage is the compression framing system may be easily installed, serviced, repaired, and maintained using standard tools. Another advantage is that the expansion force exerted by each compression frame of the compression framing system may be selectively tuned using the disclosed expansion controller based on the strength of the surrounding mounting surface and the desired level of protection. Another advantage is that forced entry attempts may be protected against without damaging the surrounding mounting surface. Another advantage is that the compression framing system may be retrofitted over an existing window, such that said compression framing system is disposed between the existing window and a protective structure, thus being inherently tamper proof due to only being accessible from the internal environment, without utilizing tamper-proof hardware. Another advantage is that each friction shoes may be configured to selectively pivot or rotate to be parallel with the mounting surface, thus allowing for the secure engagement of each friction shoe with the mounting surface The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, embodiments, aspects, embodiments or examples of the invention are illustrated in the figures of the accompanying drawings, in which:

FIG. 3A illustrates a compression frame installed within a recessed opening, according to an aspect.

FIG. 3B illustrates a security glass frame being aligned for engagement with an installed compression frame, according to an aspect.

FIG. 3C illustrates a security glass frame installed within a recessed opening through the utilization of a compression framing system, according to an aspect.

FIG. 9A illustrates a front cross-sectional view of an embodiment of a compression frame, according to an aspect.

FIG. 9B illustrates a perspective semi-transparent view of an embodiment of a compression frame, according to an aspect.

DETAILED DESCRIPTION

Figure 1:
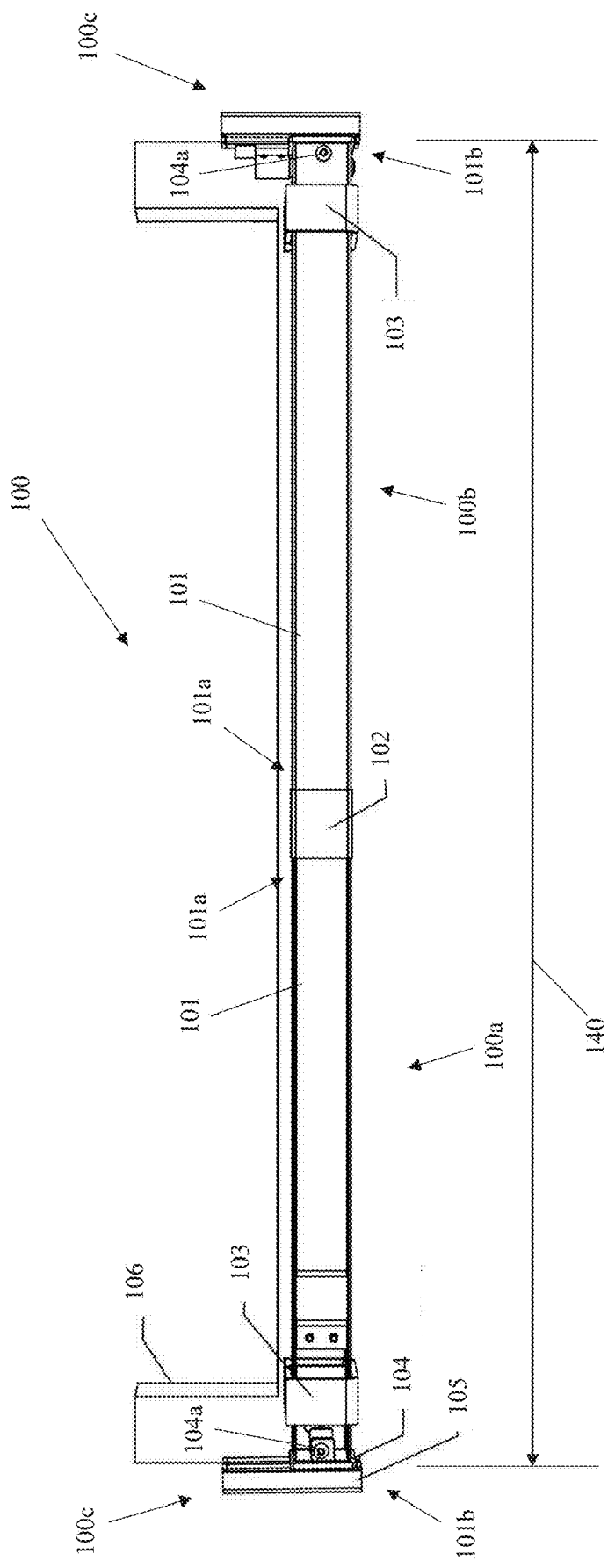
FIG. 1 illustrates the partial sectional view of the disclosed compression frame, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the partial sectional view of the disclosed compression frame 100, according to an aspect. The disclosed compression framing system may be comprised multiple compression frames 100, each having a symmetrical arrangement of compression arms 100a, 100b configured to lodge the disclosed compression frame 100 within a recessed opening through frictional engagement with an overall, surrounding mounting surface, such as surrounding mounting surface 309 of FIG. 3A. The overall, surrounding mounting surface ("surrounding mounting surface", "overall mounting surface") may be comprised of two opposing mounting surfaces, such as opposing mounting surfaces 309a, 309b of FIG. 3A, that are configured to engage with corresponding friction shoes 105 of the compression frame, as will be discussed in greater detail hereinbelow. Said compression framing system may be configured to provide a mounting structure within said building opening for the attachment of protective structure 106 such as a security window, security glass frame, security panel, or other comparable structure. The attached protective structure 106 may be configured to provide a barrier between a protected structure (such as a building the protective structure 106 is being secured to) and an outside environment, wherein the protective 106 secures a building opening and resists forced entry attempts through said building opening, as will be discussed in greater detail hereinbelow. The first compression arm 100a may be depicted from a sectional perspective view, while the second compression arm 100b may be depicted from a front perspective view. The disclosed compression framing system may be configured for use within recessed openings and may be retrofitted over a preexisting window, such as preexisting window 311 of FIG. 3A, thus protecting said preexisting window with the protective structure 106 and providing level 1 security against vandalism and forced entry attempts. Said compression framing system may utilize expansive forces exerted by each compression frame to facilitate engagement with the surrounding mounting surface, thus providing an attachment mechanism that does not require penetration of said surrounding mounting surface, adjusts to building settlement, is easily serviceable and does not leave holes or residue in the surrounding mounting surface when removed.

The disclosed compression frame 100 may be comprised of two compression arms: a first compression arm 100a and a second compression arm 100b, wherein each compression arm 100a, 100b is disposed on a corresponding opposing end 100c of the compression frame 100. Each compression arm 100a, 100b may be comprised of a hollow pipe body 101, each having an inner body end 101a configured to be inserted over an inner support beam, such as inner support beam 620 of FIGS. 6B-6C, and an outer body end 101b associated with the corresponding structures that are configured to engage with the surrounding mounting surface. Each hollow pipe body 101 may have a hollow inner core, such that the inner support beam may be partially nested within the inner body ends 101a of each hollow pipe body 101, or may otherwise engage with each compression arm 100a, 100b to secure the compression arms 100a, 100b together. Upon the engagement of each hollow pipe body 101 with the inner support beam, a middle gap, such as middle gap 622 of FIGS. 6B-6C, may be formed between the two compression arms 100a, 100b. An expansion seal 102 configured to surround the inner body ends 101a of each hollow pipe body 101 and an exposed portion of the inner support beam may be utilized in order to cover the middle gap, thus helping maintain a unified visual appearance for the disclosed compression frame 100.

Each compression arm 100a, 100b may be further comprised of connection bracket ("window overlay frame attachment") 103 secured to each corresponding hollow pipe body 101. These connection brackets 103 may be utilized to provide mounting points for a protective structure 106 to engage with each compression frame, in order to protect an associated preexisting window, door or other applicable structure from forced entries. The mounting of the protective structure 106 to each connection bracket 103 may be done easily while still preventing unauthorized disassembly and detachment of the protective structure 106 from the external environment of the protected structure by positioning the compression frames 100 between a preexisting window or comparable structure and the protective structure 106. In an embodiment, a protective structure 106 may be secured to each connection bracket 103 of each compression frame 100 through the usage of conventional nuts and bolts, screws or another suitable engagement methods.

Figure 2B:
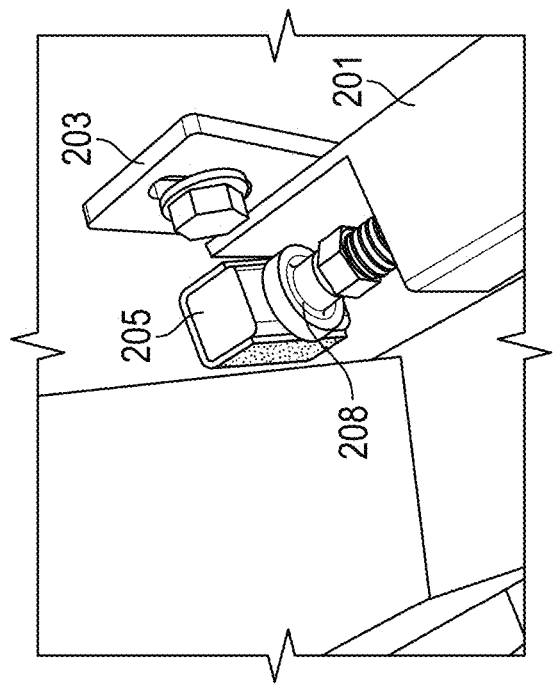
FIG. 2A-2C illustrate enlarged perspective views of an opposing end of the disclosed compression frame, according to an aspect.
Figure 2C:
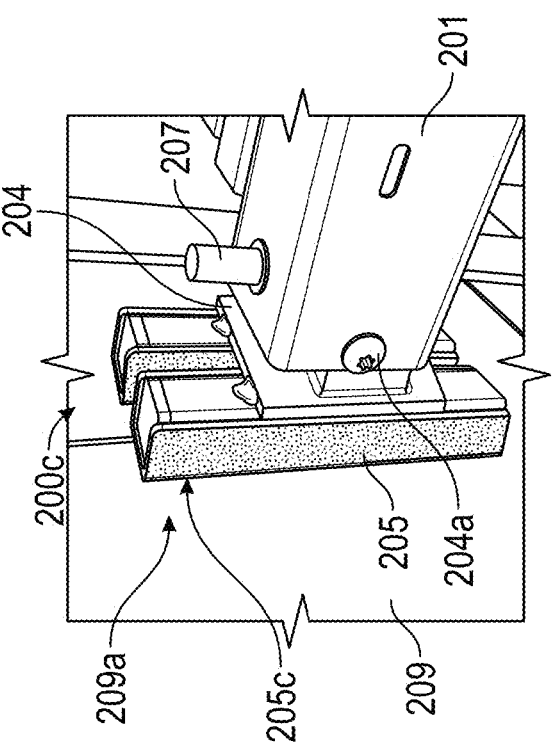
Figure 2A:
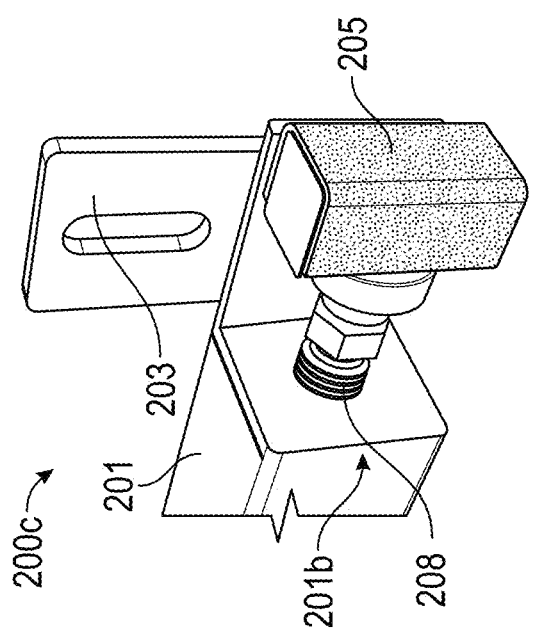

While not visible in FIG. 1, the first compression arm 100a and/or the second compression arm 100b may be further comprised of a corresponding keyed spindle, such as keyed spindle 207 of FIG. 2C. In an embodiment, each keyed spindle may be embedded through the surface of the corresponding hollow pipe body 101 in order to be accessible to a user from the outside of the hollow pipe 101, while also being engaged with a worm drive nested within said hollow pipe body 101, such as worm drive 926 of FIG. 9A. Said worm drive may be engaged with a threaded rod, such as threaded rod 208 of FIG. 2A, that is perpendicular to keyed spindle, parallel to the hollow pipe body and may travel through the outer body end 201b of said hollow pipe body 201, as seen in FIG. 2A. Said threaded rod may be further associated with a corresponding friction shoe 105 disposed at a corresponding opposing end 100c of the compression frame 100. In an embodiment, the keyed spindle may be configured to be rotated to manipulate the worm drive, in order to influence how much a corresponding friction shoe 105 extends away from the 101b outer body end 101b of a corresponding hollow pipe body 101. The interconnection of the keyed spindle, worm drive, threaded rod and friction shoe will be discussed in greater detail hereinbelow.

For simplicity, the keyed spindle, worm drive and threaded rod together may be referred to as an "expansion controller", wherein the expansion controller is associated with the hollow pipe body 101 of a corresponding compression arm 100a, 100b, and the keyed spindle is configured to be selectively manipulated to control the movement of the worm drive, and thus the threaded rod. In an embodiment, the keyed spindle may be engaged with a corresponding friction shoe 105 as well. Alternative embodiments of the expansion controller, such as an expansion controller configured to increase a distance between the first compression arm 100a and the second compression arm 100b, will be discussed in greater detail hereinbelow.

Each compression arm 100a, 100b may be further comprised of a swivel plate 104 disposed on and/or associated with the outer body end 101b of each hollow pipe body 101. This swivel plate 104 may be secured to the hollow pipe body 101 by a swivel screw 104a and engaged directly with a corresponding friction shoe 105. This swivel screw 104a may be configured to allow for the rotation/swiveling of the attached friction shoe 105 to ensure a secure engagement of said friction shoe 105 with a corresponding opposing mounting surface of the overall, surrounding mounting surface, by allowing the swivel plate 104 and an attached friction shoe 105 to swivel to conform to the angle of said opposing mounting surface. The selective swiveling of each friction shoes 105 about its pivotal engagement with the mounting frame 100 (by virtue of the rotation of the corresponding attached swivel plate 104) may allow for each friction shoe 105 to be rotated to the necessary mounting angle to be parallel with the corresponding opposing mounting surface, as seen by friction shoe 205 engaging with surrounding mounting surface 209 of FIG. 2C. The selective swiveling of each friction shoe 105 may thusly facilitate the secure engagement of the compression frame 100 with the surrounding mounting surface, even for surrounding mounting surfaces having irregular shapes, (e.g., rounded, non-rectangular, etc.)

As disclosed hereinabove, each compression arm 100a, 100b may also be further comprised of a friction shoe 105 associated with the swivel plate 104, wherein the friction shoe 105 is configured to frictionally engage with the surrounding mounting surface. This frictional engagement of the friction shoe with the surrounding mounting surface prevents the corresponding compression frame 100 from sliding or becoming dislodged or displaced from the surrounding mounting surface of the recessed opening during a forced entry attempt. The strength of the engagement between the friction shoes 105 and the surrounding mounting surface may be modified by increasing or decreasing the expansion force exerted by the compression frame 100 on the surrounding mounting surface. In order to adjust this expansion force, a keyed spindle(s) may be rotated to manipulate an internal worm drive(s). In an embodiment, rotation of the keyed spindle may manipulate the worm drive to extend or retract the friction shoe 105 away from or back toward the corresponding outer body end 101b, thus selectively modifying a separation distance (shown as arrow 140) between the friction shoe 105 on the first compression arm 100a and the friction shoe 105 on the second compression arm 100b. In another embodiment, manipulation of the keyed spindle may manipulate a worm drive to selectively increase a separation between the first compression arm 100a and the second compression arm 100b themselves. The utilization of the keyed spindle and worm drive to modify the engagement strength of the compression frame 100 with the surrounding engagement area will be discussed in greater detail hereinbelow.

The disclosed compression framing system may utilize a unique method of attachment for securing itself to a surrounding mounting surface of a recessed opening having stone cladding or another type of cladding that cannot be drilled into. Instead of penetrating said stone cladding, each compression frame 100 may be configured to exert an expansive force on the surrounding mounting surface, thus firmly compressing itself within said surrounding mounting surface. In order to allow the compression frame 100 to securely grip the surrounding mounting surface, said compression frame may utilize the hereinabove mentioned friction shoes 105 disposed at and engaged with the opposing ends 100c of said compression frame 100. These friction shoes 105 may be made of a material that is sufficiently durable and rigid and has a suitable texture, in order to securely engage with the surrounding mounting surface through a combination of the aforementioned expansion force and frictional engagement between the opposing mounting surfaces and the friction shoes 105. In an embodiment, said friction shoes 105 may be made of silicon carbide, and may be suitably textured to provide sufficient friction when engaging with a textured surface, such a granite brick.

By achieving high levels of friction between the opposing mounting surfaces and the friction shoes 105, the compression framing system, as well as any attached protective structure 106, may be securely affixed to the surrounding mounting surface, thus preventing the compression framing system and protective structure 106 from being dislodged, displaced or otherwise removed from the surrounding mounting surface during forced entry attempts. As pressure is applied by the compression frame 100, the friction shoes 105 may be configured to bite into the surrounding mounting surface. A result of this biting into the surrounding mounting surface may be a high-level of friction and resistance to movement without noticeably damaging said surrounding mounting surface.

In an embodiment, the disclosed compression framing system may be comprised of at least one compression frame 100, each compression frame having two compression arms: a first compression arm 100a and a second compression arm 100b. Each compression arm 100a, 100b may be comprised of a hollow pipe body 101 having an inner body end 101a and an outer body end 101b, a connector bracket 103 associated with the hollow pipe body 101. One or both compression arms 100a, 100b may be further comprised of a keyed spindle partially embedded into the corresponding hollow pipe body 101, a worm drive nested within the hollow pipe body and a threaded rod embedded into the outer body end 101b of the corresponding hollow pipe body 101 and engaged with and perpendicular to the keyed spindle. In certain embodiments, the hollow pipe body may be associated with a corresponding swivel plate 104 that itself is associated with a friction shoe 105, such that the friction shoe 105 may swivel to engage with an opposing mounting surface (not shown). In certain embodiments, the friction shoe 105 may not be configured to swivel, as seen in FIGS. 2A, 2B.

Figure 6A:
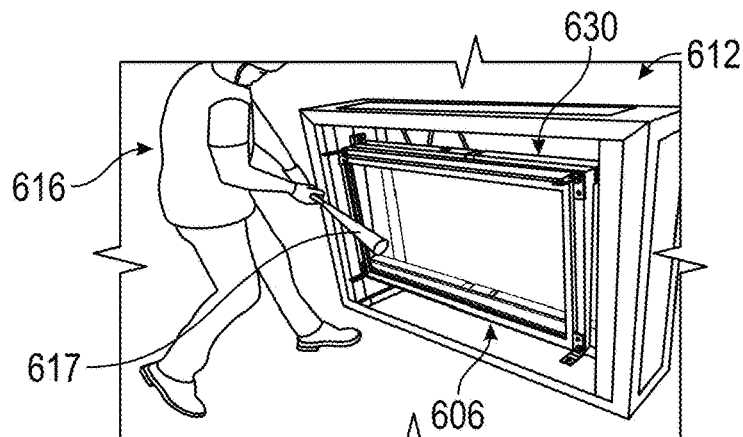
FIGS. 6A-6C illustrate various striking implements being used to attempt to dislodge the disclosed compression framing system from a test buck, according to an aspect.
Figure 6B:
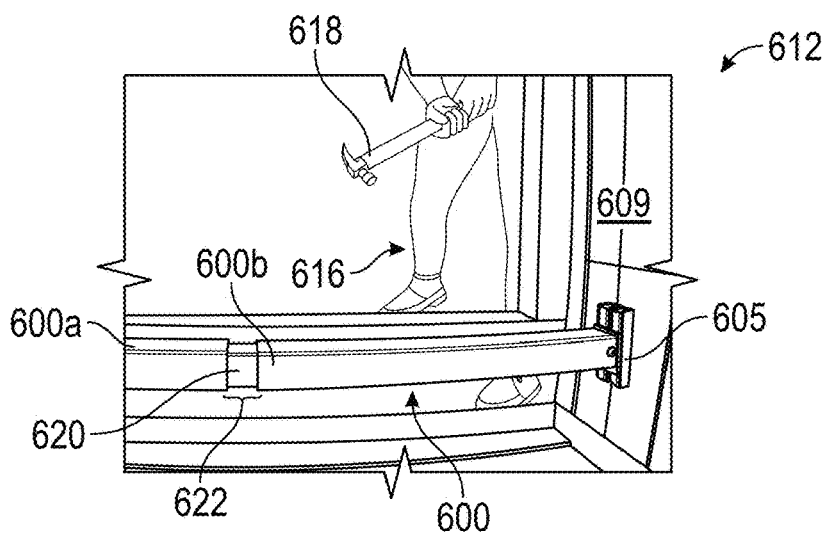
Figure 6C:
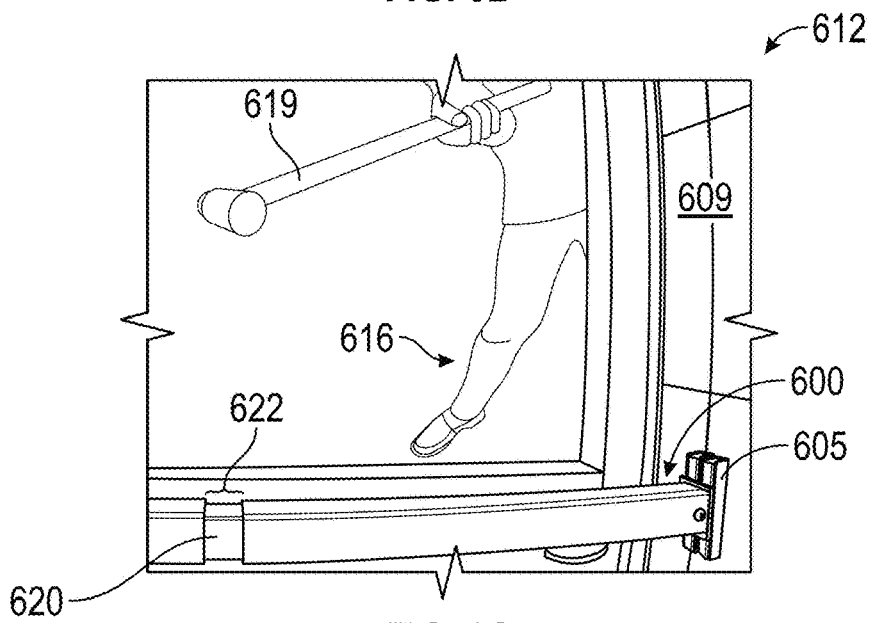

Each compression frame 100 may be further comprised of an inner support beam, such as inner support beam 620 of FIGS. 6B-6C, inserted or otherwise nested within each corresponding inner body end 101a and partially nested within both compression arms 100a, 100b to form a middle gap between the two compression arms 100a, 100b. Additionally, each compression frame 100 may have an expansion seal 102 configured to surround and seal the middle gap while covering the inner body end 101a of each hollow pipe bodies 101. Through adjustment of the keyed spindle, such as keyed spindle 207 of FIG. 2C, the engaged worm drive and attached threaded rod may be rotated to modify the separation between the friction shoe 105, selectively increasing the expansion force exerted on the surrounding mounting surface, thus further securing the disclosed compression framing system to said surrounding mounting surface.

FIG. 2A-2C illustrate enlarged perspective views of an opposing end 200c of the disclosed compression frame, according to an aspect. As described hereinabove, in an embodiment, each keyed spindle ("spindle", "keyed shaft") 207, threaded rod 208, swivel plate 204 and friction shoe 205 may be disposed at the opposing ends 200c of a compression frame and/or the outer body ends 201b of each hollow pipe body 201. In an embodiment, the rotation of the keyed spindle 207 may be configured to rotate of the threaded rod 208 and thus move of a corresponding friction shoe 205 closer to or further from the hollow pipe body 201, depending on the direction of said rotation. If the friction shoe 205 is already in contact with the surrounding mounting surface 209, an increased expansion force will be exerted on said surrounding mounting surface 209.

In certain embodiments, the swivel screw 204a may be used to secure the swivel plate 204 to the corresponding hollow pipe body 201 while still allowing the swivel plate to swivel as necessary to allow the friction shoe 205 to engage with the surrounding mounting surface 209 to secure the compression frame within a recessed opening as needed. By increasing the expansion force exerted on the surrounding mounting surface 209 by the compression frame, the frictional engagement of the friction shoe 205 with said surrounding mounting surface 209 may be strengthened, thus reducing the likelihood of the compression frame becoming dislodged from an impact to an attached protective structure. It should be understood that certain embodiments may be configured to facilitate pivoting of the friction shoes, as seen in FIG. 2C, while certain other embodiments may lack a pivot plate and pivot screw, and this not allow for the pivoting of the friction shoes, as seen in FIG. 2A-2B. It should be understood that allowing the friction shoes 205 to pivot may allow them to be rotated to be parallel with the surrounding mounting surface 209, or more specifically the corresponding opposing mounting surface 209a of the surrounding mounting surface 209 that the specific friction shoe 205 engages with directly. As such, in an embodiment, the contacting face 205c of a friction shoe 205 that is configured to engage directly with a corresponding opposing mounting surface 209a of the surrounding mounting surface 209 may be configured to be parallel with the corresponding opposing mounting surface 209a to maximize the engagement area between the friction shoe 205 and the surrounding mounting surface 209, as seen in FIG. 2C.

In an embodiment, such as that of FIG. 2A or FIG. 2B, the threaded rod 208 may be both engaged with the keyed spindle 207 and the friction shoe 205, such that rotation of the keyed spindle 207 causes the rotation of the threaded rod 208 and thus resultant extension or retraction of the friction shoe 205 away from the corresponding hollow pipe body 201. Due to the threaded characteristic of the threaded rod 208, its rotation may cause the attached friction shoe 205 to move closer to or away from the keyed spindle 207, depending on the direction the keyed spindle is rotated. Again, if the friction shoe 205 is already in contact with the surrounding mounting surface 209, the amount of expansive force exerted on the surrounding mounting surface will increase or decrease depending on the direction the keyed spindle 207 is rotated. The threaded rod 208 may be coaxially aligned with and partially nested within the hollow pipe body 201 of a corresponding compression arm, whereas the keyed spindle 207 may be perpendicular to the threaded rod 208, to allow the keyed spindle to travel through the hollow pipe body 201 to provide an easily accessible engagement point for manipulating the worm drive and the attached threaded rod 208.

Figure 4B:
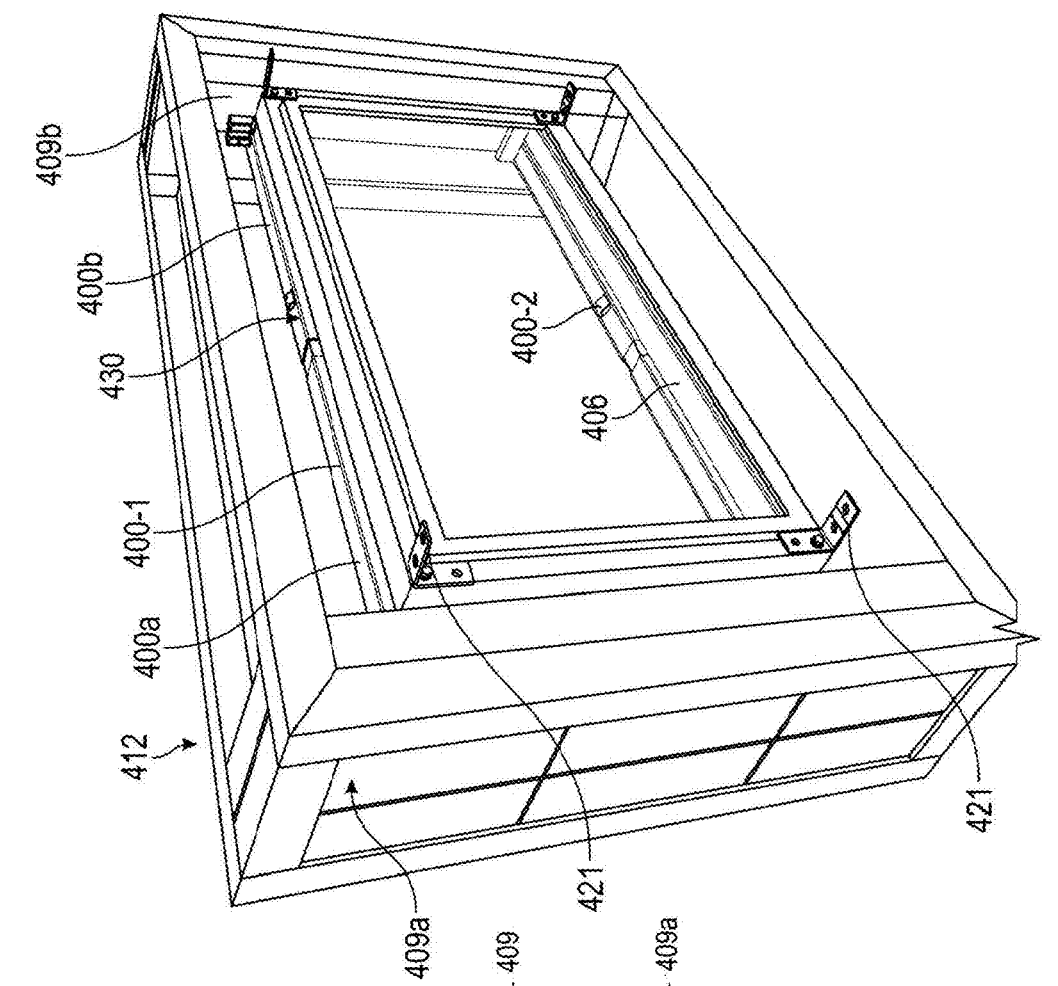
FIGS. 4A-4B illustrate the perspective views of a compression framing system installed within a test buck, according to an aspect.

The positioning and quantity of the connection brackets 203 provided by a compression frame to mount a protective structure may be varied as necessary, depending on the size and weight of the protective structure being mounted. Larger or heavier protective structures may require additional connection brackets 203 on a central body portion of each compression frame, as seen in FIG. 3A, to ensure the protective structure is suitably secured within the surrounding mounting surface of the recessed opening. It should be understood that a compression framing system having a plurality of compression frames may be installed within a recessed opening, such that each protective structure may be secured within a recessed opening by each perimeter portion of each protective structure. In an embodiment, a two compression frames may be installed within a recessed opening, such that a singular rectangular protective structure may be supported by four connector brackets, as seen in FIG. 4B, wherein each connector bracket is sufficiently close to a corresponding corner of the rectangular protective structure, to provide it with sufficient support.

FIG. 3A illustrates a compression frame 300 installed within a recessed opening 310, according to an aspect. FIG. 3B illustrates a protective structure 306 being aligned for engagement with an installed compression frame 300, according to an aspect. FIG. 3C illustrates a protective structure 306 installed within a recessed opening 310 through the utilization of a compression framing system, according to an aspect. It should be understood that a surrounding mounting surface 309 is a portion of the recessed building opening ("recessed opening", "building opening", "opening") 310 that the compression framing system is configured to engage with. More specifically, the compression framing system may be configured to engage with opposing mounting surfaces 309a, 309b of an overall, surrounding mounting surface 309 of the building 350 to facilitate its secure engagement within the opening 310 of the building 350. A preexisting window 311, door or other structure may already exist within the recessed opening 310, such that a protective structure 306 is provided to protect the preexisting window 311 from being damaged, while simultaneously preventing forced entry through said recessed opening 310.

The process of installing a protective structure 306 over a preexisting window 311 may begin with the installation of a compression frame 300 within the recessed opening 310 between the preexisting window 311 and the external environment (outside of the building) 325, as seen in FIG. 3A. It should be understood that multiple compression frames 300 may be utilized to form a compression framing system to properly support a protective structure 306. Each compression frame 300 may be configured to have a length slightly smaller than that width of the recessed opening 310, such that each compression frame 300 may be easily positioned within the recessed opening 310 during installation, and then have each of its keyed spindles, such as keyed spindle 207 of FIG. 2C, rotated to extend out each friction shoe and/or compression arm to securely engage with the surrounding mounting surface 309 of said recessed opening 310. Each compression frame 300 may be positioned horizontally to the window base/ground to suitably align with non-transparent portion (e.g., the frame portion) of a protective structure 306.

Next, a protective structure 306 may be inserted within the recessed opening between the compression framing system and the external environment 325, such that each compression frame 300 is disposed between the preexisting window 311 and the protective structure 306. It should be understood that the compression framing system may no longer be accessible from the external environment at this point, and that installation must continue from the internal environment (inside the building).

Finally, a protective structure 306 may be secured to the compression frame(s) 300 by securing the protective structure 306 to each connection bracket 303. The connection brackets 303 may utilize mounting screws 303a to attach to the protective structure 306. These mounting screws 303 may be accessed and manipulated by opening the preexisting window 311 from the internal environment.

By ensuring these mounting screws 303a and the other elements of the compression framing system are only accessible from the internal environment after installation, individuals in the external environment 325 will not be able to tamper with the compression framing system, thus ensuring it is only accessed by authorized personnel. Despite being inaccessible to individuals in the external environment, the disclosed compression framing system may be easily accessed by a user in the internal environment by simply opening the preexisting window 311 and manipulating each compression frame 300 using standard tools. This will allow for easy installation, maintenance, repair and replacement of parts as needed.

Figure 7A:
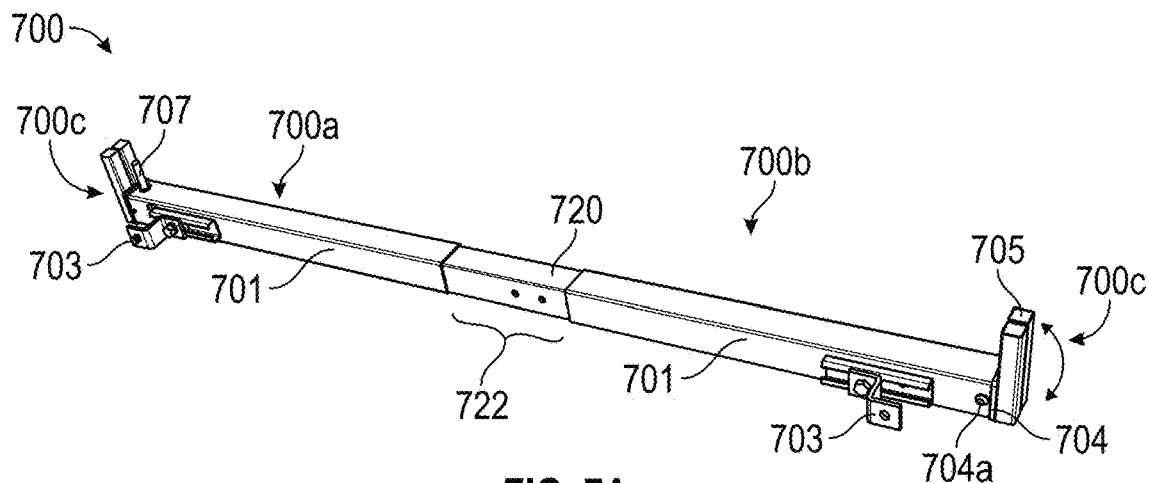
FIG. 7A illustrates an embodiment of the disclosed compression frame in the expanded configuration, according to an aspect.

It should be understood that while each compression frame 300 of compression framing system is described as engaging with a surrounding mounting surface 309 of a building 350, each compression arm, such as first compression arm 700a and second compression arm 700b of FIG. 7A, of a compression frame may be engaged with a corresponding opposing mounting surface 309a, 309b of the overall, surrounding mounting surface 309. In an embodiment, the overall mounting surface 309 of the building 350 may be comprised of a first opposing mounting surface 309a and a second opposing mounting surface 309b, wherein a first compression arm of a compression frame 300 may be configured to engage with the first opposing mounting surface 309a and the second compression arm of a compression frame may be configured to engage with the second opposing mounting surface. This engagement of the compression framing system with opposing mounting surfaces 309a, 309b of a recessed opening of a building will be discussed in greater detail hereinbelow.

Figure 4A:
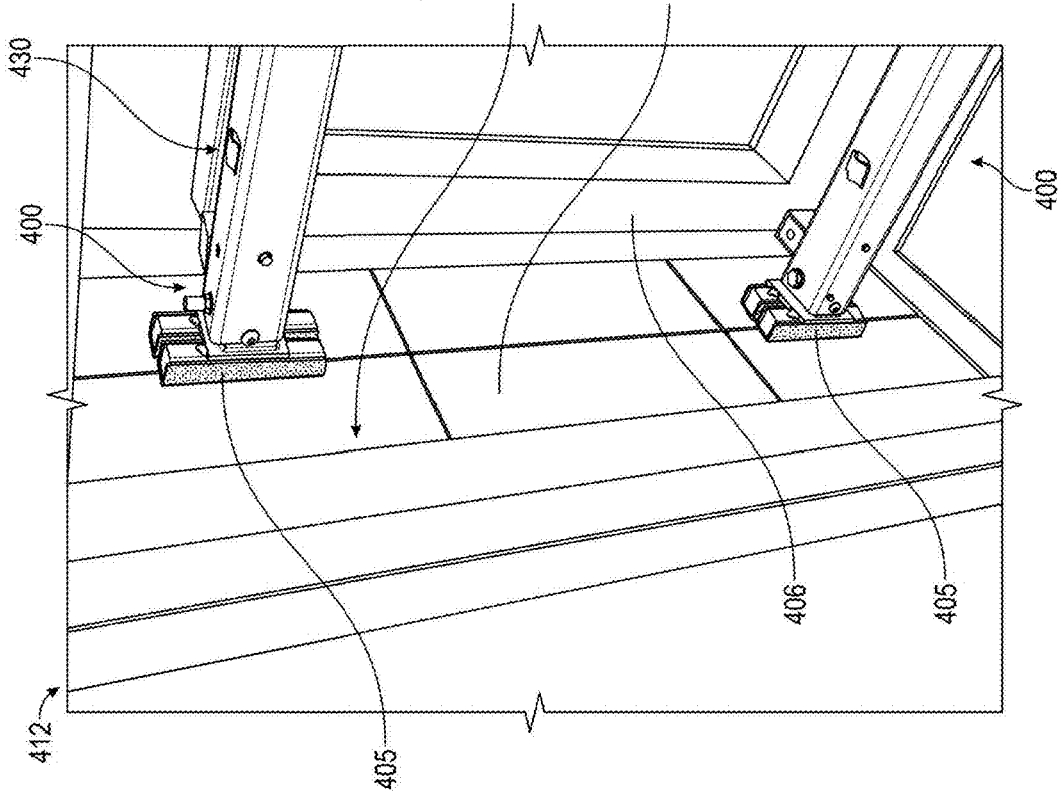

FIGS. 4A-4B illustrate the perspective views of a compression framing system 430 installed within a test buck 412, according to an aspect. As described hereinabove, the purpose of the disclosed compression framing system 430 is to provide a mounting structure that is resistant to being moved or displaced by a forced entry attempt without damaging or penetrating the surrounding mounting surface (the cladding/exterior) of a building that it engages with. Additionally, it is desirable for said compression framing system 430 to be easy to install, service and replace, while maintaining a desirable visual aesthetic. The disclosed compression framing system 430 of FIG. 4A-4B may be comprised of two compression frames 400. In the disclosed embodiment, a test buck 412 was constructed from a steel pipe framework that utilized concrete filled masonry blocks as the surrounding mounting surface 409, thus creating a simulated surrounding mounting surface 409 having a surface texture comparable to those found in the field. The disclosed test buck 412 was utilized for the load bearing and forced entry tests depicted in FIGS. 5A-5B and FIGS. 6A-6C, respectively. Unless otherwise noted, each element of the disclosed compression framing system 430 may be made of steel or another suitably strong materiel to ensure said compression framing system 430 is not damaged from a forced entry attempt or other forces.

In the disclosed embodiment of FIGS. 4A-4B, each compression frame 400 installed within the test buck 412 may have two connector brackets, and thus 4 total connector brackets on the disclosed compression framing system 430. Each compression frame 400 was installed within the test buck between the provided opposing mounting surfaces 409a, 409b and configured to exert 1600 lbs. of expansion force/pressure on the test buck 412. It should be noted that the expansion force/pressure of each compression frame 400 may be easily adjusted by using a suitable tool to rotate the prior disclosed keyed spindle, thus requiring no additional adhesives or fasteners to engage with the surrounding mounting surface. The friction shoes 405 may be made of silicon carbide, rubber or another suitable material that can facilitate secure engagement with a surrounding mounting surface 409 without damaging said surrounding mounting surface 409. Other elements of the compression frames 400 may be made of steel, durable metal, or another suitably durable material and may utilize weather resistant coatings to maintain its integrity for many years, even when exposed to extreme temperature.

As can also be seen in the disclosed embodiment in FIGS. 4A-4B, a rectangular protective structure 406 was secured to the compression framing system using the provided connector brackets, as disclosed hereinabove. In the disclosed embodiment, said protective structure 406 utilized Riot Glass AP375 impact resistant polycarbonate panels, which may be configured for use in the protection of historic buildings. In order to provide suitable attachment points for load testing the disclosed compression framing system 430, an L-bracket 421 was secured to each of the four corners of the protective structure 406. For the tests disclosed below in FIGS. 5A-5B and FIGS. 6A-6C, the friction shoes 405 were comprised from silicon carbide, a material which is sufficiently hard and has a suitable texture to frictionally engage with the material of the surrounding mounting surface 409 (e.g., concrete) without causing any damage to it.

As can be seen in FIG. 4B, an embodiment of the compression framing system 430 may be comprised of two compression frames: a first compression frame 400-1 and a second compression frame 400-2. In order to provide a mounting structure with suitably positioned engagement points (e.g., connector brackets, such as connector bracket 203 of FIG. 2A), the first compression frame 400-1 may be positioned such that it is parallel with the second compression frame 400-2. This may effectively result in corresponding connector brackets on each compression arm be evenly spaced from each other, thus forming a rectangular arrangement of connector brackets, wherein a singular connector bracket is positioned at each corner of said rectangular arrangement. This in turn may allow the connector brackets to engage with corner portions of an attached protective structure, thus allowing the compression framing system to provide the necessary support to hold the protective structure firmly in place within a recessed opening, such as recessed opening 310 of FIG. 3A.

As disclosed hereinabove, each compression arm 400a, 400b of a compression frame 400 may be configured to engage directly with a corresponding opposing mounting surface 409a, 409b of a building, accordingly. In an embodiment, each first compression arm 400a of each compression frame 400 of a compression framing system 430 may be configured to engage with a first opposing mounting surface 409a, whereas each second compression arm 400b of each compression frame 400 of a compression framing system 430 may be configured to engage with a second opposing mounting surface 409b. It should be understood that the friction shoe 405 of each compression arm 400a, 400b is configured to engage directly with the corresponding opposing mounting surface 409a, 409b, accordingly.

Figure 5B:
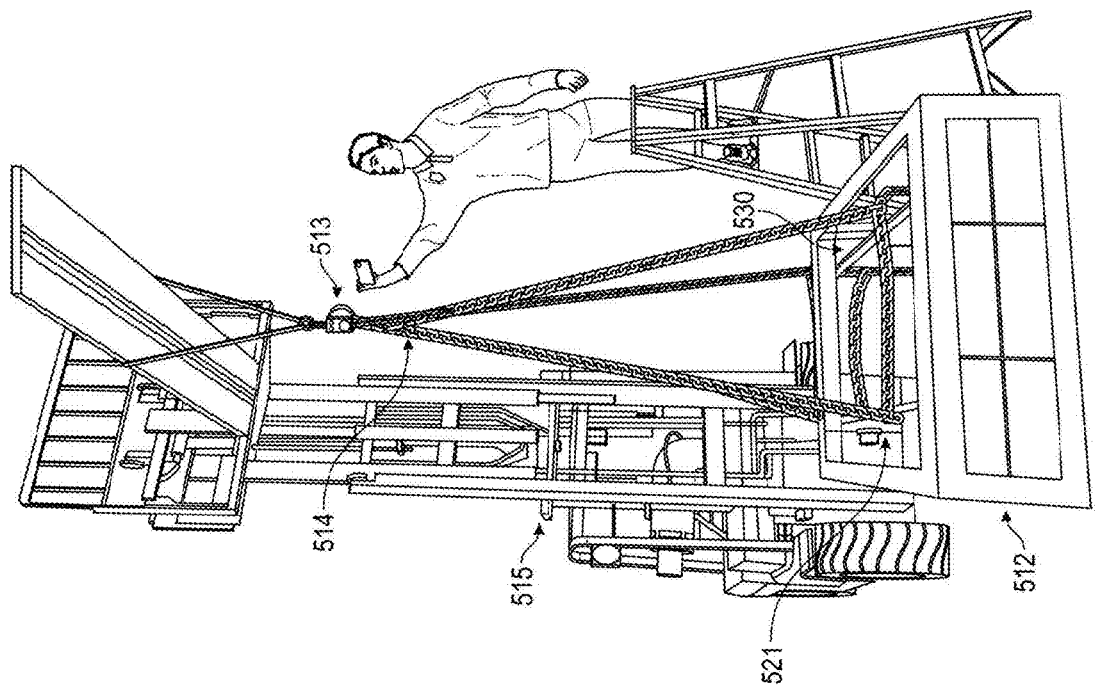
FIGS. 5A-5B illustrate a compression framing system undergoing prolonged load bearing testing using a test buck, according to an aspect.
Figure 5A:
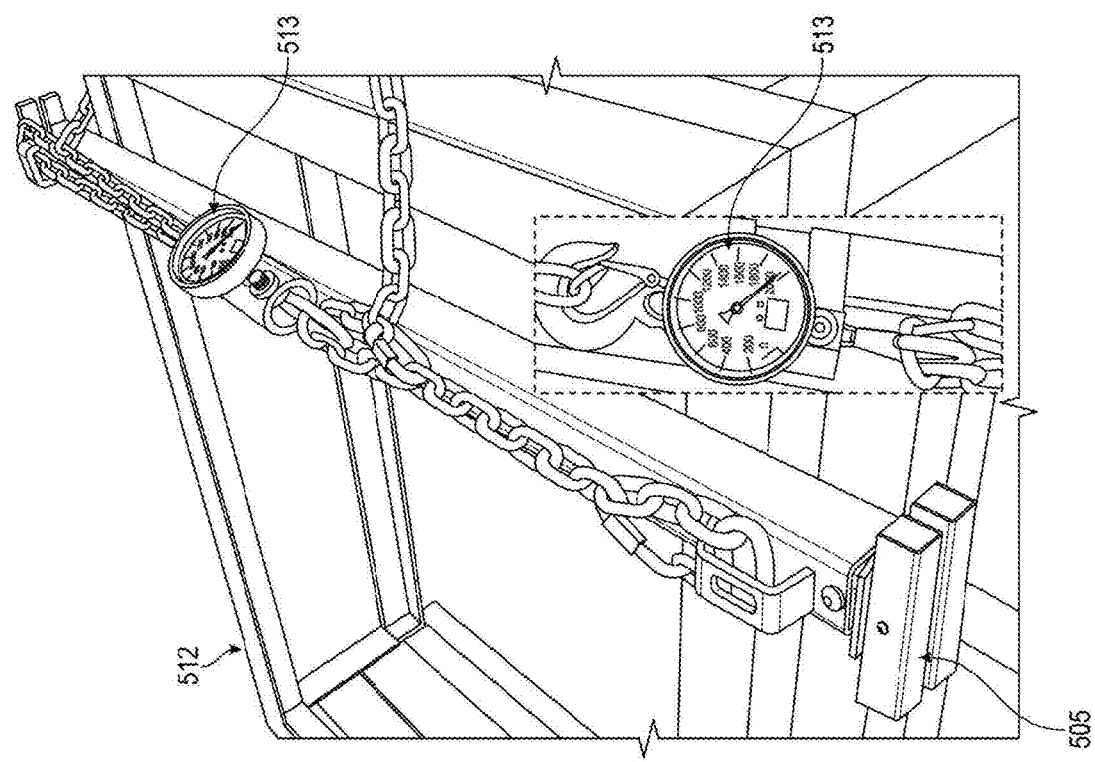

FIGS. 5A-5B illustrate a compression framing system 530 undergoing prolonged load bearing testing using a test buck 512, according to an aspect. The following test was performed to assess how the disclosed compression framing system 530 resists displacement and slippage from the surrounding mounting surface while a significant force is applied to the attached protective structure for a prolonged period of time. The friction shoes 505 were deployed into the surrounding mounting surface of the test buck 512 at a force of 1000 lbs. per compression frame. This expansion force was calculated from linear data correlating ft lb. torque at adjustment spindle and lbs. of expansion force between friction shoes 505. In the disclosed embodiment, the hereinabove disclosed L-brackets 521 were secured to a forklift 515 by chains 514. The protective structure, which was secured to the test buck 512 by the compression frames of the compression framing system, was suspended from by the attached L-brackets 521.

When the test buck was hoisted by the forklift, as seen in FIG. 5B, the weight of the test buck 512 was exerted on the friction shoes 505 as a downward force of approximately 872 lbs. The force exerted on the friction shoes 505 was calculated using the attached force gauge 513. The test buck 512 was suspended for approximately one hour and the compression framing system 530 held firmly in place and did not show any signs of slipping or otherwise becoming displaced.

The results of this prolonged load test indicated that the disclosed compression framing system 530 is configured to resist significant forces for extended periods of times without slipping or being displaced. It should be understood that the force exerted by each compression frame 500 on the surrounding mounting surface may be modified based on its application in order to maximize the amount of force the compression framing system 530 can withstand, while also minimizing the potential of damage to the surface of the mounting structure.

FIGS. 6A-6C illustrate various striking implements being used to attempt to dislodge the disclosed compression framing system from a test buck 612, according to an aspect. In order to assess if the disclosed compression framing system 630 was capable of withstanding an abrupt impact, an embodiment of the compression framing system 630 was installed within a test buck 612 as disclosed hereinabove in FIGS. 4A-4B. The test buck 612 was positioned vertically during testing, to simulate the standard orientation of the compression framing system 630 after being retrofitted over a preexisting window, as seen in FIG. 3A-3C.

Figure 7B:
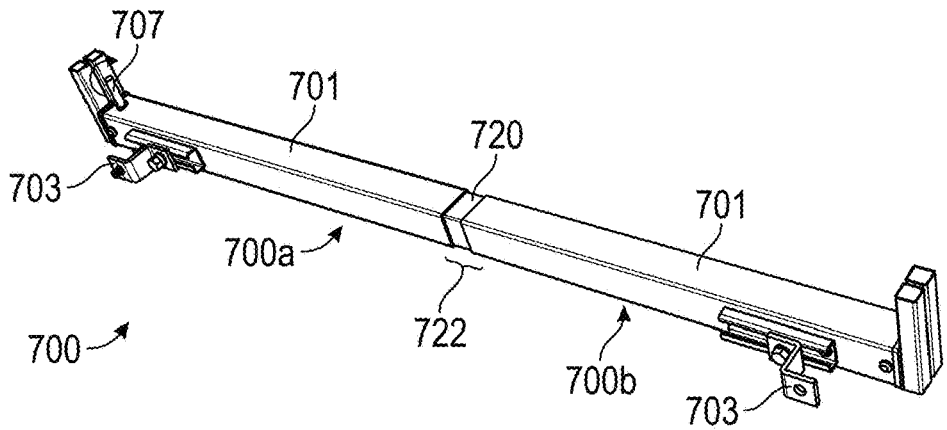
FIG. 7B illustrates an embodiment of the disclosed compression frame in the compressed configuration, according to an aspect.

As disclosed hereinabove, each compression arm 600a, 600b of a compression frame 600 may nest around and engage with an inner support beam 620, such that a middle gap 622 is formed between the two compression arms 600a, 600b. This inner support beam 620 may be a hollow pipe having a suitable wall thickness to withstand the forces exerted by the compression framing system 630 without being damaged or deformed. In an embodiment, the inner support beam 620 may be configured to be at least partially nested within the inner body end of the first compression arm 600a and partially nested within the inner body end of the second compression arm 600b to secure the first compression arm to the second compression arm, as can be seen in FIG. 7A-7B. While omitted in FIGS. 6A-6C, an expansion seal, such as expansion seal 102 of FIG. 1, may be provided to cover the middle gap 622 between the two compression arms 600a, 600b to provide a unified appearance and prevent proliferation of materials into the middle gap 622

In the embodiment of FIG. 6A, a tester 616 used a baseball bat 617 to repeatedly strike the protective structure 606 held by the compression framing system 630. While the expansion force of each compression frame 600 was set to 1000 lbs., the compression framing system 630 was not displaced or deformed and provided no indication of slippage from being repeatedly struck with said baseball bat 617.

In the embodiment of FIG. 6B, a tester 616 used a 21-ounce framing hammer 618 to repeatedly strike the protective structure 606 held by the compression framing system 630. While the expansion force of each expansion frame 600 was set to 1000 lbs., the compression framing system 630 was not displaced or deformed and provided no indication of slippage from being repeatedly struck with the said framing hammer 618.

In the embodiment of FIG. 6C, a tester 616 used a 13-pound sledgehammer 619 to strike the protective structure 606 held by the compression framing system 630. In order to suitably resist slippage from the increased impact force of the 13-pound sledgehammer 619, the expansion force of each compression frame was set to 1600 lbs. While the expansion force of each expansion frame was set to 1600 lbs., the compression framing system 630 was not displaced or deformed and provided no indication of slippage from being repeatedly struck with the said sledgehammer 619.

As illustrated by the test results disclosed hereinabove, through utilization of the proper operating conditions, the disclosed compression framing system 630 having two compression frames 600 provides exceptional protection against the above-described striking implements, as well as their equivalents. In each of the above tests, the friction shoes 605 of the compression frames 600 remained frictionally engaged with the surrounding mounting surface without being displaced, thus indicating that the compression framing system 630 was capable of repelling these simulated forced entry attempts without being displaced. Furthermore, even at the greater expansion force of 1600 lbs., per compression frame 600, the compression framing system did not damage or mar the surrounding mounting surface 609. It should be understood that the compression frames 600 may be configured to provide up to 6000 lbs. of expansion force per pair of compression frames 600 (3000 lbs. of force per compression frame), so forced entry attempts using larger, heavier objects may also be repelled as necessary through suitable adjustments to the utilized expansion force.

Post installation adjustments may be required and easily provided by maintenance personnel using appropriate torque values provided by the manufacturer to adjust the rotation of the keyed adjustment spindles, such as keyed spindle 207 of FIG. 2C. Adjustments and maintenance may be easily performed on the compression framing system 630 through the utilization of standard tools, as tamper resistant materials, such as tamper resistant screws, are not required, given that said compression framing system 630 may be positioned between the preexisting window and the installed protective structure, and thus may remain inaccessible from the external environment.

FIG. 7A illustrates an embodiment of the disclosed compression frame 700 in the expanded configuration, according to an aspect. FIG. 7B illustrates an embodiment of the disclosed compression frame 700 in the compressed configuration, according to an aspect. As can be seen in FIG. 7A and FIG. 7B, the mechanism through which the hereinbelow disclosed compression frame 700 expands in order to secure itself within a surrounding mounting surface may differ from certain prior disclosed embodiments. The hereinbelow disclosed compression frame 700 embodiment of FIG. 7A-7B may only utilize one keyed spindle 707 that is directly associated with a first compression arm 700*a* in order to suitably adjust the expansion (e.g., length) of the compression frame 700. The second compression arm 700*b*, in contrast, may not be directly engaged with a keyed spindle 707. Furthermore, the keyed spindle 707 associated with a first compression arm 700*a* may engage with an internally disposed worm drive (not shown) that is configured to selectively move the second compression arm 700*b* away from the first compression arm 700*a*, thus increasing the separation between the corresponding friction shoes 700. This extension of the second compression arm 700*b* may be controlled by rotating the keyed spindle 707, as depicted in FIG. 7B, and disclosed hereinabove. This extension of the second compression arm 700*b* away from the first compression arm 700*a* may effectively increases the length of the compression frame 700, allowing its friction shoes 705 to engage with the surrounding surface more securely and with greater force. The inner support beam 720 may remain partially nested within the body portions 101 of both compression arms 700*a*, 700*b* to ensure that the compression arms 700*a*, 700*b* remain suitably interconnected.

As such, the middle gap 722 may be larger in configurations in which the second compression arm 700*b* is extended further from the first compression 700*a*, as depicted in FIG. 7A and smaller when it is not, as depicted in FIG. 7B. Aside from the aforementioned change in the way the expansion controller increases the effective length of the compression frame 700 (e.g. extends the friction shoes 705), the other disclosed elements of the compression frame 700 may be largely unchanged. The connection brackets 703 may still be utilized to engage with a protective structure such as a transparent security panel to protect the preexisting window, or other suitable structure, from forced entry, vandalism, small arms fire, etc. Additionally, swivel screws 704*a* may engage with a swivel plate 704 and corresponding hollow pipe body 701 to allow the swivel plate 704 (and thus the attached friction shoes 705) to swivel accordingly, as depicted in FIG. 7A, to facilitate suitable engagement of each friction shoe 705 with a surrounding mounting surface.

As disclosed hereinabove, the utilization of compression frame 700 of FIG. 7A-7B within a compression framing system may result in a different arrangement for the overall compression framing system. Said compression framing system may have at least one compression frame 700, each compression frame 700 comprising two compression arms: a first compression arm 700*a* and a second compression arm 700*b*, wherein each compression arm 700*a*, 700*b* is disposed on a corresponding opposing end 700*c* of the compression frame. Each compression arm 700*a*, 700*b* may be comprised of a hollow pipe body 701, a connection bracket 703 secured to the hollow pipe body 700 and configured to engage with a protective structure, and a friction shoe 705 associated with the hollow pipe body 700, said friction shoe 705 being configured to engage directly with the surrounding mounting surface. Each friction shoe 705 may be secured to a corresponding hollow pipe body 701 through engagement with a swivel plate 704, wherein the swivel plate 704 is configured to pivotally attach to a corresponding hollow pipe body 701.

Said compression framing system may be further comprised of an inner support beam 720 configured to engage with the hollow pipe body 701 of each compression arm 700*a*, 700*b* to secure the two compression arms together and an expansion controller associated with one of the hollow pipe bodies of the first compression arm 700*a*. In order to enable the compression frame's engagement with the surrounding mounting surface, the expansion controller may be configured to adjust the separation between the friction shoes on opposing compression arms 700*a*, 700*b* of a compression frame 700 by increasing the separation between the two compression arms themselves. By rotating the keyed spindle 707 on the associated first compression arm 700*a*, the internally concealed worm drive may increase the overall length of the compression frame 700 by sliding the second compression arm 700*b* along the inner support beam 720, while still keeping the two compression arms secured together by said inner support beam 720.

Figure 8:
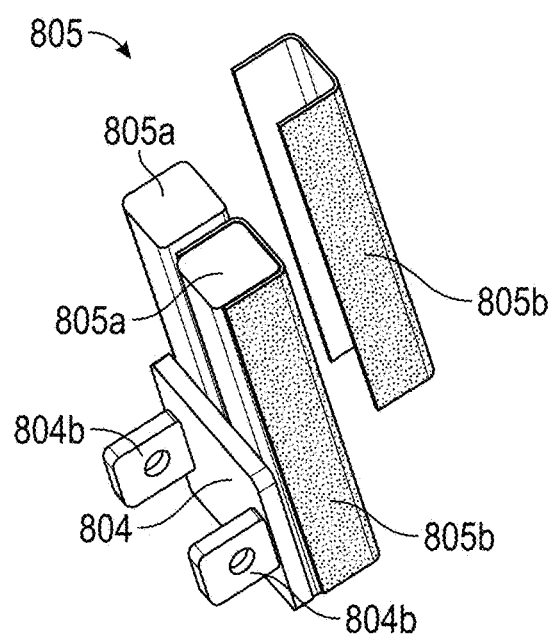
FIG. 8 illustrates a perspective view of swivel plate engaged with a friction shoe, according to an aspect.

FIG. 8 illustrates a perspective view of swivel plate ("pivot plate") 804 engaged with a friction shoe 805, according to an aspect. As can be seen in FIG. 8, each friction shoe 805 may be further comprised of a carbide covered steel cover(s) ("carbide-chip sole", "sole", "cover") 805*b* configured to provide a suitable gripping surface on each compression frame to facilitate secure engagement with a rough surface for mounting. As such, a friction shoe 805 may be comprised of two friction shoe blocks 805*a* and two covers 805*b*, wherein the two friction shoe blocks 805*a* are configured engage directly with the swivel plate 804 and a corresponding cover 805*b*. Each friction shoe block 805*a* may be configured to engage with a cover 805*b*, such that the cover 805*b* engages directly with the surrounding mounting surface. In such an embodiment, the friction shoe blocks 805*a* may be made of rubber, which the covers 805*b* may be made of silicon carbide. The rubber of friction shoe blocks 805*a* may be configured to be sufficiently compressible and the silicon carbide of the cover 805*b* may be configured to provide sufficient friction to allow the associated compression frame to engage securely with the opposing mounting surfaces without causing any damage to either opposing mounting surface. In an embodiment, a swivel plate 804 may be comprised of a pair of screw ports 804*b* configured to engage with a swivel screw, such as swivel screw 704*a* of FIG. 7A, to facilitate pivotal engagement of the swivel plate 804 with corresponding hollow pipe body.

The provided carbide-chip soles 805*b* may be configured to provide an anti-slip surface configured for use with stone surfaces but said carbide-chip soles 805*b* may be adjusted or modified accordingly for engagement with different surfaces. As disclosed hereinabove, the friction shoe 805 may be suitably attached to the swivel plate 804 to ensure their proper engagement between the surrounding mounting surface and the hollow pipe body of the corresponding compression frame. The swivel plate 804 may be welded, or otherwise secured, directly to the friction shoes 805, in order to ensure a secure attachment of said elements. The covers 805*b* may also be secured to the friction shoe blocks 805*a* through any suitable method, including welding or strong adhesives. Each friction shoe may be about 1 inch thick to provide a suitable buffer between the swivel plate 804 and the surrounding mounting surface.

As described hereinabove, the herein disclosed compression framing system is configured to expand within a recessed opening or other suitable surrounding mounting surface to provide a solid mounting structure for a protective structure, security cover attachment, etc. The disclosed compression frames of the compression framing system provide a mechanism for mounting structures, such as security windows, within surrounding mounting surfaces that do not allow drilling, such as many state or federal building from the early 1900's. By utilizing a suitable material for the friction shoe 805 or cover 805*b*, this disclosed non-destructive mounting system may be implemented without damaging the outer surfaces of historical structures, thus providing a mechanism to protect these historical structures without damaging them in the process.

Figure 9C:
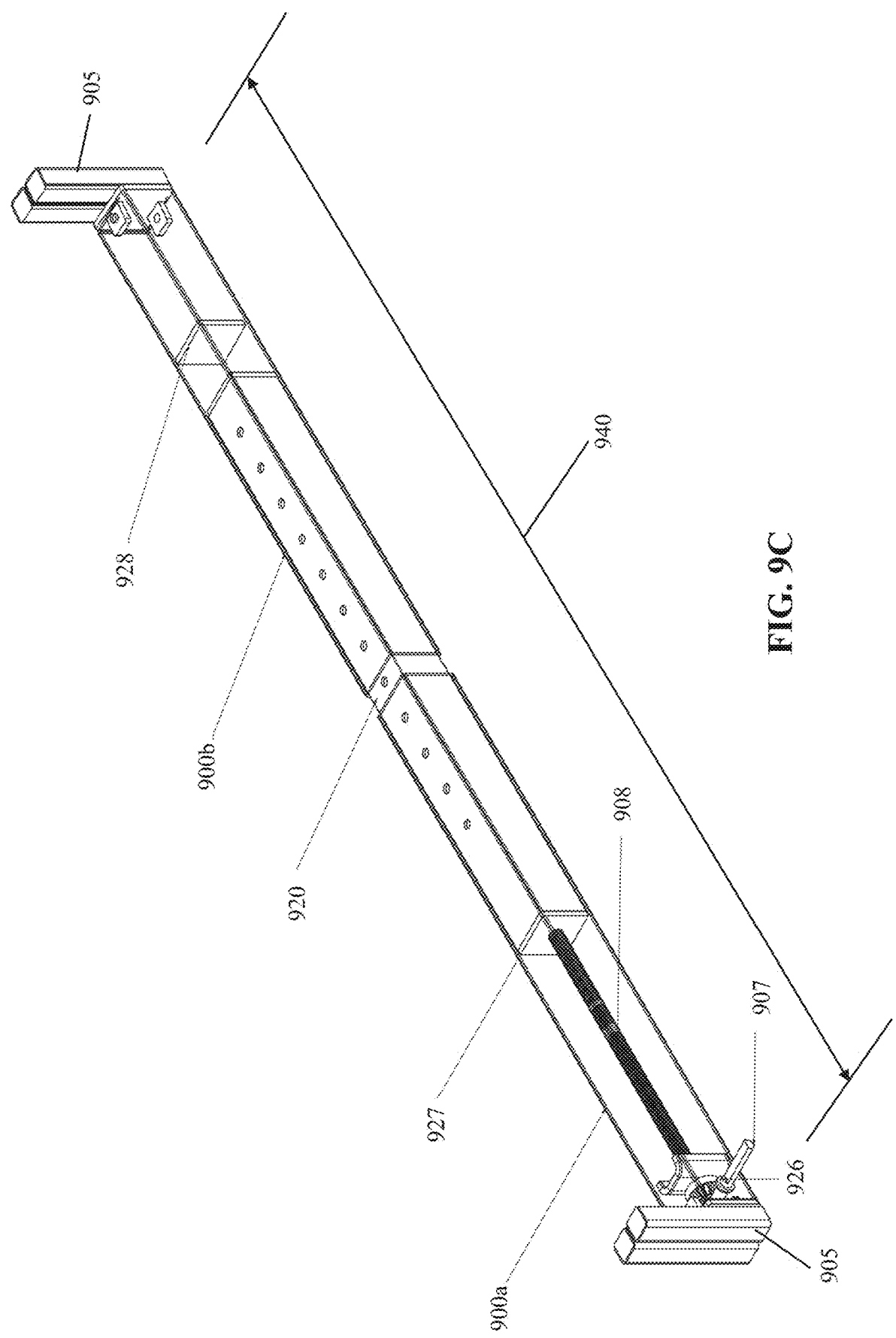
FIG. 9C illustrates a perspective semi-transparent view of an embodiment of a compression frame, according to an aspect.

FIG. 9A illustrates a front cross-sectional view of an embodiment of a compression frame 900, according to an aspect. FIG. 9B illustrates a perspective semi-transparent view of an embodiment of a compression frame 900, according to an aspect. FIG. 9C illustrates a perspective semi-transparent view of an embodiment of a compression frame, according to an aspect. As discloses hereinabove, certain embodiments of the compression frame 900 may utilize an internally disposed worm drive 926 that is configured to selectively move the second compression arm 900*b* away from the first compression arm 900*a*. To facilitate movement of the second compression arm 900*b* as described hereinabove, a keyed spindle 907 that is partially nested within the hollow pipe body 901 of the first compression arm 900*a* may be configured to engage with a worm drive 926 that is nested within the hollow pipe body 901 of the first compression arm 900*a*.

The worm drive 926 may be further engaged with a threaded rod 908, wherein the threaded rod 908 is engaged with a threaded block 927, wherein the threaded block 927 may be welded to, or otherwise engaged with, the inner support beam 920, such that rotation of worm drive 926 and threaded rod 908 results in extension (or retraction) of the inner support beam 920 away from (or toward) the first compression arm 900*a*. The inner support beam 920 may be further configured to engage with a pressure plate 928 nested within the second compression arm 900*b*, such that the extension of the inner support beam 920 results in the extension of the second compression arm 900*b* away from the first compression arm 900*a*, as described hereinabove. As such, the inner support beam 920 may be nested within the first compression arm 900*a* such that it partially telescopes out of the hollow pipe body 901*a* of the first compression arm 900*a* as it extends, thus increasing the separation distance 940 between the friction shoes 905, as well as the distance between the compression arms 900*a*, 900*b* themselves. In short, the inner support beam 920 may be engaged with the expansion controller to facilitate the movement of the second compression arm 900*b* away from the first compression arm 900*a*, which may be used to increase the expansion force exerted on a surrounding mounting surface. In an embodiment, counterclockwise rotation of the keyed spindle may result in the extension of the second compression arm 900*b* away from the first compression arm 900*a*.

As disclosed hereinabove, the term expansion controller 924 may be used to describe the combination of the worm drive 926, threaded rod 908 and the keyed spindle 907, wherein manipulation of expansion controller 924 is configured modify the overall length of a compression frame 900 and/or the expansion force it exerts on the surrounding mounting surface. As can be seen in FIG. 9A-9B, because the keyed spindle 907 and threaded rod 908 are perpendicular to each other, an additional transmission element in the form of a worm drive 926 may be utilized to allow the rotation of the key spindle 907 to rotate of the threaded rod 908. The worm drive 926 may be nested within the hollow pipe body 901 of the first compression arm 900*a* and configured to engage with the keyed spindle 907 and the threaded rod 908. The worm drive 926 may be comprised of a vertical gear 926*a* configured to engage with the keyed spindle 907 and a horizontal gear 926*b* configured to engage with the threaded rod 908, wherein the vertical gear 926*a* is configured to further engage with the horizontal gear 926*b* to convert the rotational direction as depicted in FIG. 9A. As such, the engagement of the worm drive 926 with the keyed spindle 907 and the threaded rod 908 allows a user to rotate the keyed spindle 907 to increase the length of the compression frame 900 or the expansion force exerted by the compression frame 900 on the surrounding mounting surface, accordingly. For simplicity, it may be stated that the keyed spindle 907 is engaged with the worm drive 926, such that rotation of the keyed spindle results in increasing the separation distance 940 between the friction shoes 905.

It should be understood that in embodiments wherein a friction shoe is configured to be extended away from the corresponding compression arm, such as friction shoe 205 of FIG. 2A. a comparable worm drive structure may be utilized to convert the rotation of the corresponding keyed spindle 207 into rotation of the threaded rod 208 and subsequent extension of the friction shoe 205 away from the corresponding hollow pipe body 201, to increase the length of and/or expansion force by the compression frame 200.

In an embodiment, a user may place the compression frame 900 within an applicable recessed opening, such as recessed opening 310 of FIG. 3A, rotate the keyed spindle 907 until each friction shoe 909 is engaged with a corresponding opposing mounting surface, and then continue to rotate the keyed spindle 907 until the compression frame exerts the necessary expansion force to remain securely affixed to the opposing mounting surfaces of the surrounding mounting surface. Each compression frame 900 of a compression framing system may exert the same expansion force upon the applicable surrounding mounting surface to prevent uneven force exertion on said surrounding mounting surface, unless it is desirable to do so.

In alternative embodiments, the structure of the expansion controller 924 may be modified as necessary to include different types of structures configured to allow a user to manipulate the length of and expansive force exerted by the expansion controller 924. Other embodiments of the expansion controller 924 may utilize pneumatics, hydraulics or other suitable mechanical means to allow for selective manipulation of the compression arms. In an embodiment, the hollow pipe body 901 of the first compression arm 900*a* may be configured to be airtight, such that an attached pressurized air source may be used to selectively control the movement of the inner support beam, and thus the second compression arm, thus allowing the compression frame to operate similarly to a pneumatic cylinder. In an alternative variation of the above embodiment, the air may be replaced with a hydraulic fluid, such that the compression frame operates similarly to a hydraulic cylinder. As such, the term expansion controller may be understood to encompass a wide range of devices configured to facilitate manipulation of the length/expansive force of the compression frame 900, including but not limited to pneumatics, hydraulics, and comparable mechanical equivalents.

Figure 10A:
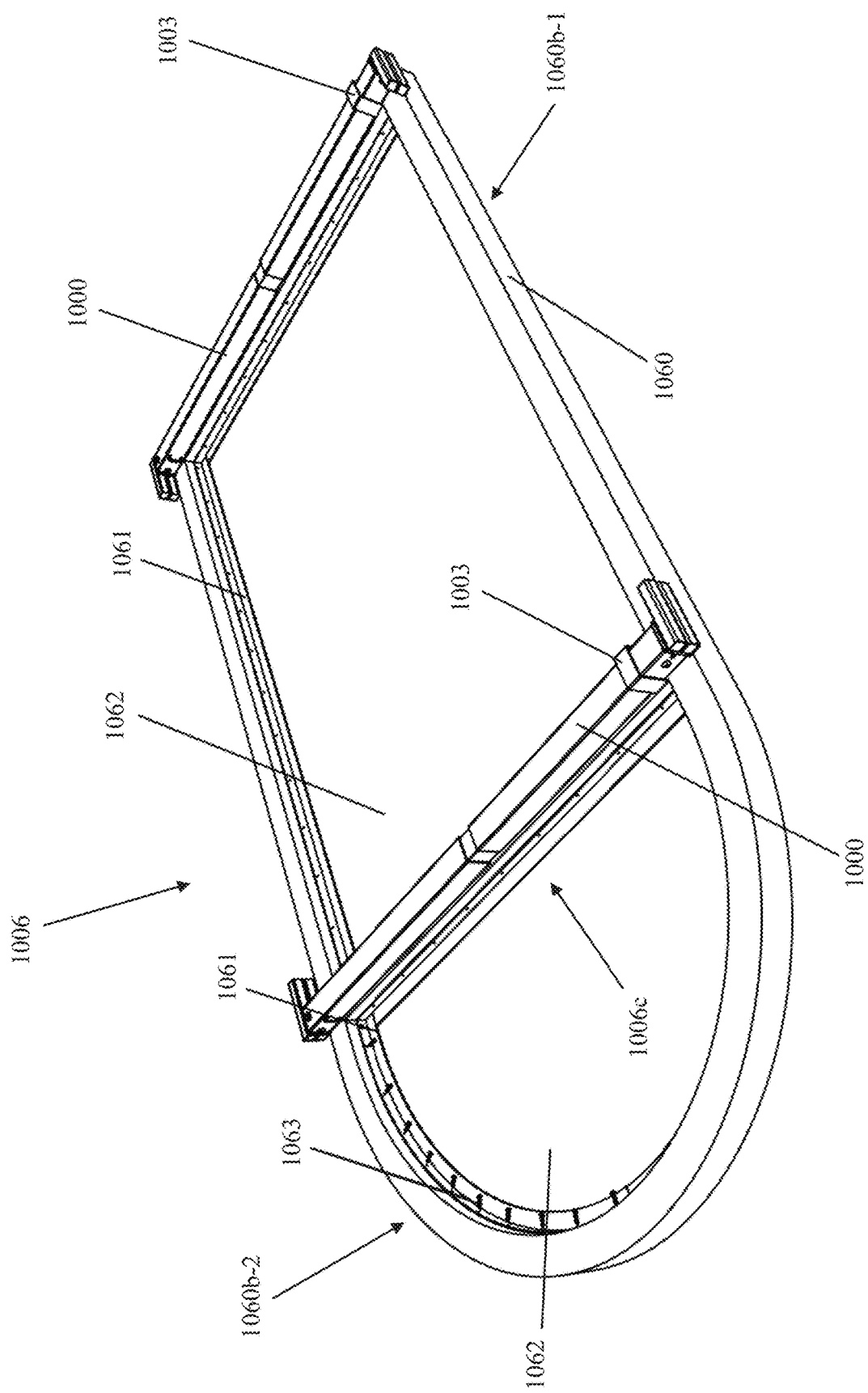
FIG. 10A illustrates a rear perspective view of a compression framing system having two compression frames engaged with a security glass frame, according to an aspect.
Figure 10B:
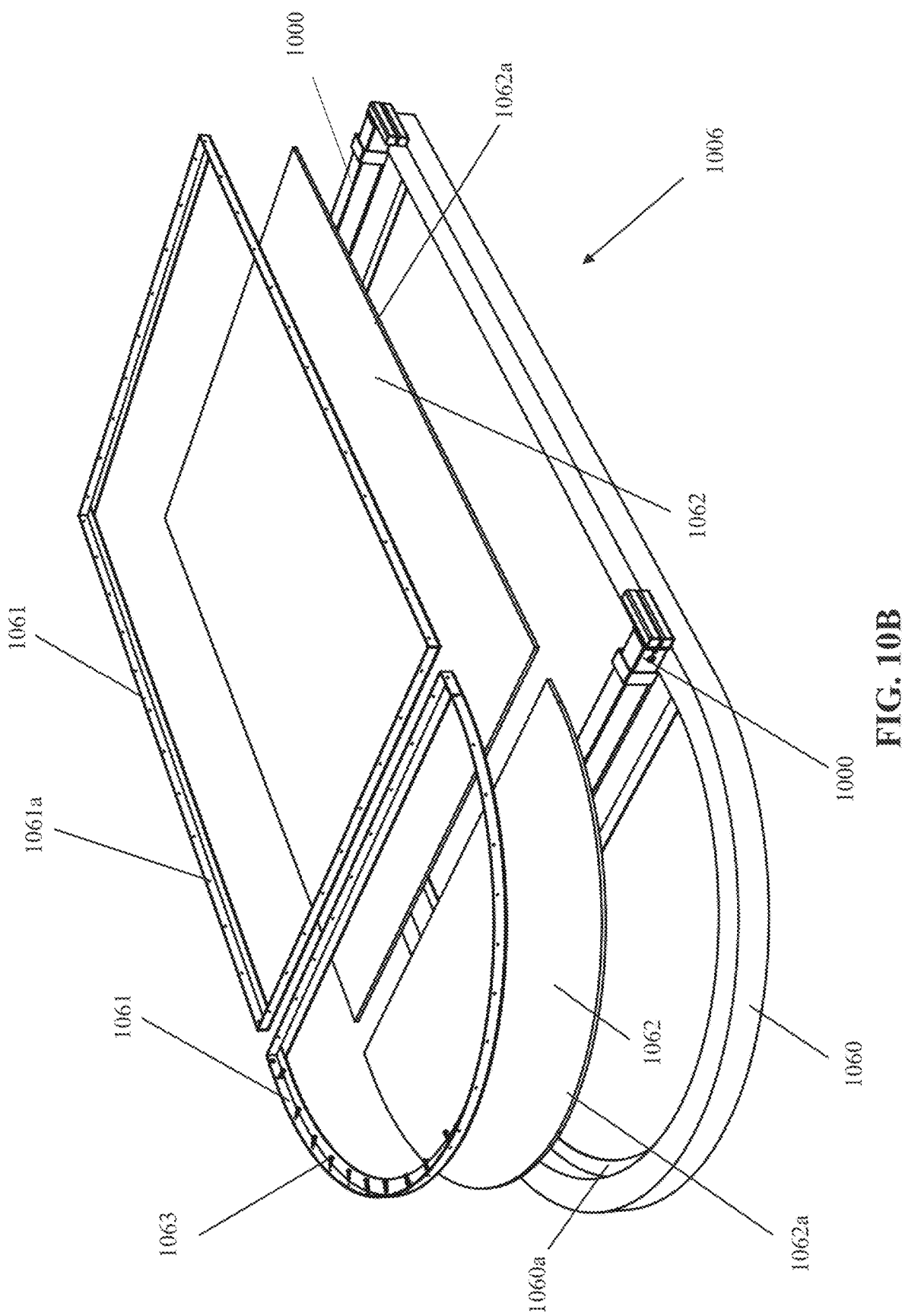
FIG. 10B illustrates a rear exploded view of a compression framing system having two compression frames engaged with a security glass frame, according to an aspect.
Figure 10C:
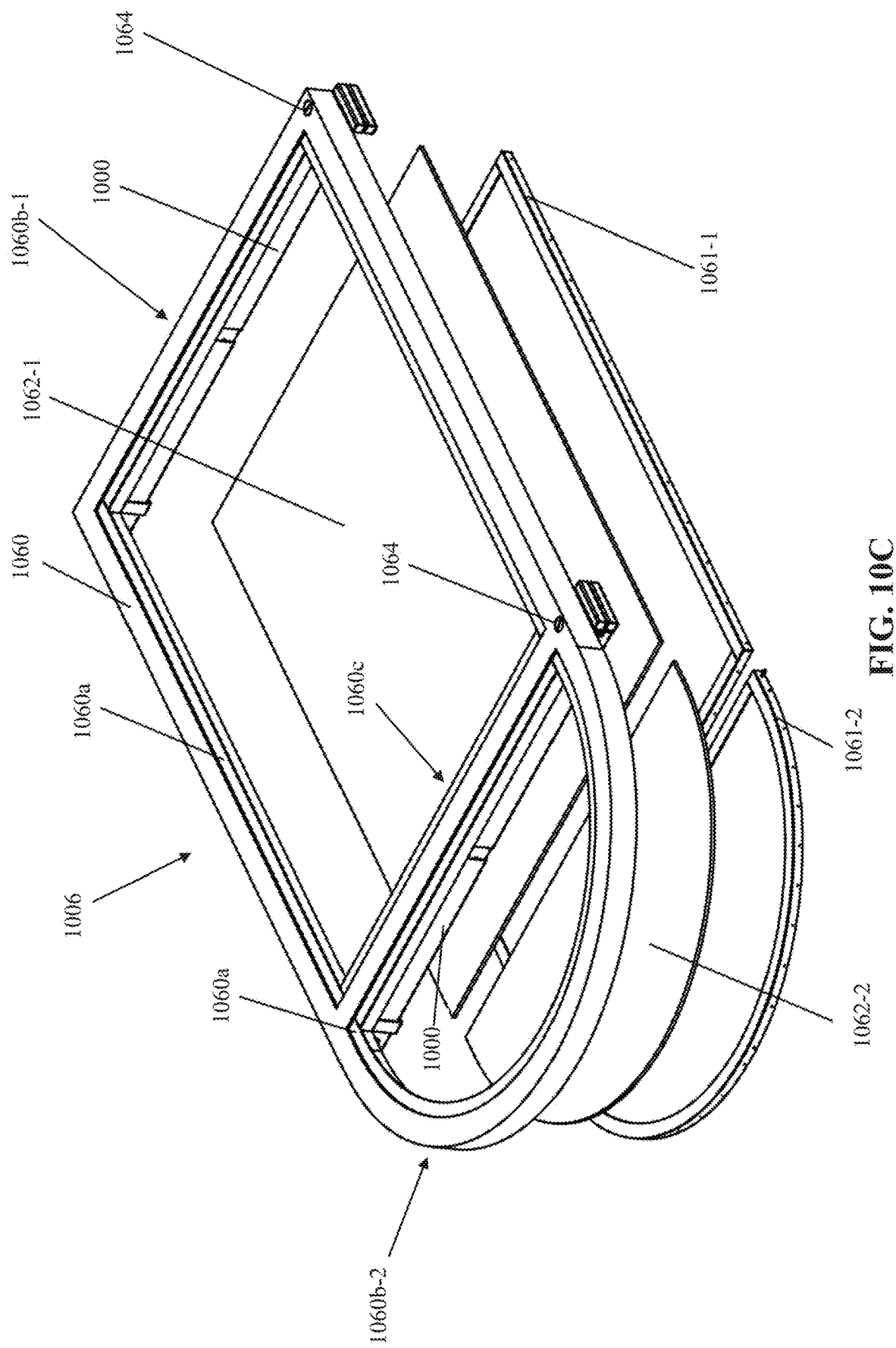
FIG. 10C illustrates a front exploded view of a compression framing system having two compression frames engaged with a security glass frame, according to an aspect.

FIG. 10A illustrates a rear perspective view of a compression framing system having two compression frames 1000 engaged with a security glass frame 1006, according to an aspect. FIG. 10B illustrates a rear exploded view of a compression framing system having two compression frames 1000 engaged with a security glass frame 1006, according to an aspect. FIG. 10C illustrates a front exploded view of a compression framing system having two compression frames 1000 engaged with a security glass frame 1006, according to an aspect. As disclosed hereinabove, a compression framing system may be comprised of a plurality of compression frames 1000 engaged with a protective structure, wherein the compression framing system is configured to prevent entry through the surrounding structure using said protective structure. As can be seen in FIG. 10A-10C, the protective structure may be a security glass frame 1006.

Said security glass frame 1006 may be comprised of a panel frame body 1060, a clamp ring 1061 configured to securely engage with the panel frame body 1060 and a security panel 1062 configured to be securely compressed between the clamp ring 1061 and the panel frame body 1060. More specifically, a perimeter portion 1062a of the security panel 1062 may be configured to be compressed between a panel stop 1060a of the panel frame body 1060 and the clamp ring 1061 upon engagement of the clamp ring 1061 with the panel frame body 1060. The panel stop 1060a may be welded or otherwise fixed to the panel frame body 1060 to facilitate secure engagement. In an embodiment, the clamp ring 1061 may be configured to engage with the panel frame body 1060 through the utilization of threaded fasteners 1063, wherein the threaded fasteners are configured to be threaded through the clamp ring 1061 and into the panel frame body 1060. In an embodiment, the panel body frame 1060 may be comprised of a 3 inch square cross-section tube (3"× 3" cross section), wherein the panel body frame is fabricated through welding, or another suitable manufacturing method. The panel frame body 1060, clamp ring 1061 and threaded fasteners 1063 may all be made of a suitably strong and durable material, such as steel. The security panel 1062 may be made a sufficiently strong and transparent material, such as polycarbonate, that is capable of preventing access through the building opening that the compression framing system is engaged with, even if struck by a heavy object, ballistic projectile, etc., depending on the application of the security panel.

The security glass frame 1006 may be configured to engage with each compression frame 1000 in order to allow the security glass frame 1006 to be suitably secured within a building opening or other compatible surface. As described hereinabove, the security glass frame 1006 may be secured to each compression frame 1000 by at least one corresponding connection bracket 1003. The positioning and quantity of these connection brackets 1003 on each compression frame 1000 may be varied, as long as they are capable of providing suitable engagement points between each compression frame 1000 and the security glass frame 1006. Each connection bracket 1003 of each compression frame 1000 may be configured to engage directly with the panel frame body 1060 of the corresponding security glass frame 1006 in order to facilitate secure interconnection between the security glass frame 1006 and the compression frames 1000.

It should be understood that the thickness of the security panel 1062 may be suitably adjusted based upon the needs of the application, in order to achieve the necessary level of protection against accidental impacts, forced entry attempts, ballistic impacts, etc. In an embodiment, the panel frame body 1060 and clamp ring 1061 may be configured to secure and security panel 1062 have a thickness ranging from about 0.375 inches to about 1.5 inches. As disclosed hereinabove, the security panels 1062 used within a security glass frame 1006 may be comprised of polycarbonate, or another material having the appropriate characteristics for the application. In an example, a security glass frame 1006 may be configured to utilize a polycarbonate panel having a thickness of about 1.5 inches to provide a ballistic impact resistant barrier between a protected structure and the outside environment. Depending on the thickness of the security panel 1062 used, the clamp ring 1061 may be adjusted accordingly, being moved forward to be closer to the panel stop 1060a for thinner security panels 1062, or backward to be further from the panel stop 1060a for thicker security panels 1062, to ensure secure compression of the security panel 1062 between the panel frame body 1060 and the clamp ring 1061.

The size, layout and structure of the security glass frame 1006 may be suitably chosen based upon the size and shape of the window or other structure the compression framing system is configured to be attached to. In the disclosed embodiment of the FIG. 10A-10C, the panel frame body 1060 is comprised of two separate portions, a rectangular base portion 1060b-1 and a rounded top portion 1060b-2, which are separated by a cross bar 1060c. As such, two separate security panels 1062-1, 1062-2 may each be configured to be seated within a corresponding body portion 1060b-1, 1060b-2 of the panel frame body 1060 and engaged with a corresponding clamp ring 1061-1, 1061-2 to secure the security panels 1062-1, 1062-2 between the panel frame body 1060 and a corresponding clamp ring 1061-1, 1061-2, as seen in FIG. 10C. It should be understood that the quantity, position and shape of each security panel 1062-1, 1062-2, clamp ring 1061-1, 1061-2 and panel frame body portion 1060b-1, 1060b-2, may be adjusted accordingly based on the building opening or structure that the compression framing system is configured to engage with.

In order to allow for adjustments to be made to the compression frames 1000 while being attached to a security glass frame 1006 and installed within the structure, an access plug ("adjustment access cover") 1064 may be nested within an adjustment port (not shown) that is embedded or nested within the panel frame body 1060. In an embodiment, a security glass frame 1006 configured to engage with multiple compression frames 1000 may have an access plug 1064 for each compression frame 1000, wherein, each access plug 1064 is appropriately positioned to allow for adjustment of the corresponding compression frame 1000, as required. In an embodiment, each access plug 1064 may be threaded, such that the access plug 1064 is configured to be selectively engaged with a threaded adjustment port.

Each access plug 1064 may be configured to allow an authorized user to manipulate or otherwise adjust the corresponding compression frame 1000 from the exterior environment beyond the protected structure. As such, each access plug 1064 may be configured to be tamper proof through the utilization of tamper proof fittings or other known tamper proof/tamper resistant technologies to ensure that only authorized personnel are able to make said adjustments, as will be discussed in greater detail hereinbelow. In order to facilitate access to a compression frame 1000 from the external environment, an authorized user may use an appropriate tool, such as custom spanner wrench 1165 of FIG. 11, to remove the corresponding access plug(s) 1064 from the panel frame body 1060. Upon removal of the access plug 1064, the authorized user may then adjust a corresponding compression frame 1000 through a corresponding adjustment port nested within the panel frame body 1060. It should be understood that each adjustment port may travel fully through the panel frame body 1060, such that an authorized users may access a compression frame 1000 from the external environment upon removing the corresponding access plug 1064

In an embodiment, an authorized user may remove an access plug 1064 from the panel frame body 1060 to reveal an adjustment port nested within the panel frame body 1060, then slot a corresponding adjustment tool (not shown) through the adjustment port to engage with and manipulate the keyed spindle, such as keyed spindle 907 of FIG. 9C, of the corresponding compression frame 1000. The authorized user may repeat this process for each compression frame 1000 that requires adjustment. Upon performing the required adjustments, the authorized user may reinstall the access plug(s) 1064 within their corresponding adjustment ports, to prevent unauthorized access to each compression frame 1000. An embodiment of the disclosed access plug 1064 and a corresponding specialized tool configured to manipulate it will be discussed hereinbelow.

Figure 11:
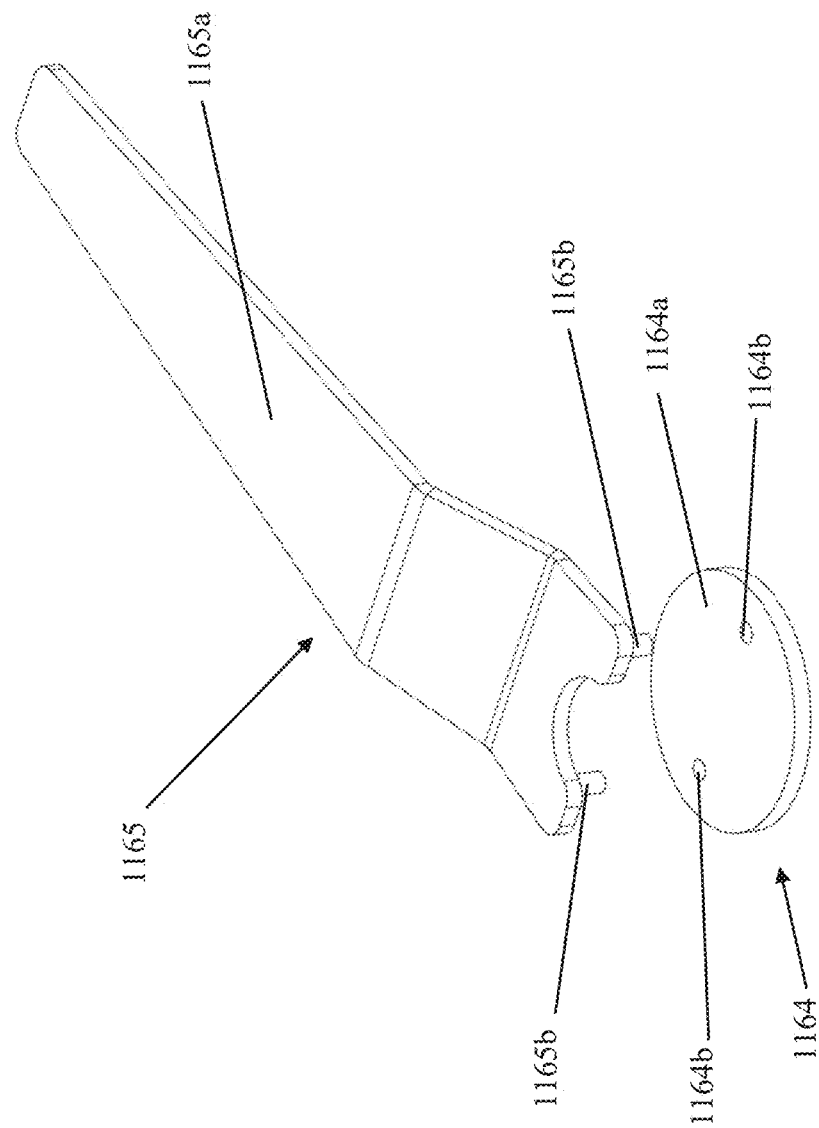
FIG. 11 illustrates a top perspective view of an access plug and a custom spanner wrench configured to engage with the access plug, according to an aspect.

FIG. 11 illustrates a top perspective view of an access plug 1164 and a custom spanner wrench 1165 configured to engage with the access plug 1164, according to an aspect. As described hereinabove, access plugs 1164 may be configured to be threaded into the panel frame body, such as panel frame body 1060 of FIG. 10C, within corresponding threaded adjustment ports (not shown). The reversible engagement between the access plugs 1164 with the panel frame body allows an authorized user having a specialized tool to manipulate and remove each access plug from the panel frame body to allow the authorized user to access the compression frames, such as compression frame 1000 of FIG. 10C, to adjust each compression frame of a compression framing system as necessary. Each access plug 1164 may be comprised of an access plug body 1164a and a pair peg holes 1164b nested within the access plug body 1164a. It should be understood that more or fewer peg holes 1164b may be nested within the access plug body 1164a, depending on the structure of the corresponding custom spanner wrench 1165 used to manipulate the access plug 1164.

The custom spanner wrench 1165 configured to be used to selectively remove the access plugs 1164 from the panel frame body may engage with the pair of peg holes 1164b of each access plug 1164, as will be disclosed hereinbelow. The custom spanner wrench 1165 may be comprised of a spanner body 1165a having a pair of key pegs 1165b. The proprietary sizing, spacing and arrangement of this pair of key pegs 1165b is such that each key peg 1165b is configured to engage with a corresponding peg hole 1164b nested within an access plug 1164 simultaneously. This in turn allows the custom spanner wrench 1165 to securely engage with the access plug 1164. Upon securely engaging with an access plug 1164, the custom spanner wrench 1165 may be turned in order to loosen or tighten the corresponding access plug 1164, accordingly. Upon being fully loosened (e.g., being rotated until it is disengaged with the threading of the adjustment port), the access plug 1164 may be fully removed from its corresponding adjustment port (not shown) nested within the panel frame body. This will allow an authorized user to interface with the keyed spindle, such as keyed spindle 907 of FIG. 9C, or another portion of a compression frame, accordingly.

It should be noted that variations to the size, shape, quantity and arrangement of key pegs 1165b on the custom spanner wrench 1165 and the corresponding peg holes 1164b nested within access plug body 1164a may be made as necessitated or desired for a specific application. While each key peg 1165b and peg hole 1164b may be cylindrical in shape (having a circular cross-sectional shape) in the disclosed embodiment, other shapes of key peg 1165b/peg hole 1164b may be utilized, such as square cross-section holes, triangle-cross-section holes, etc. Furthermore different quantities of key pegs 1165b/peg holes 1164b may be utilized, such as an embodiment of an access plug having three peg holes 1164b, with a corresponding custom spanner wrench 1165 having three correspondingly positioned key pegs 1165b, each key peg 1165b being configured to nest within a corresponding peg hole 1164b simultaneously, similarly to what is described hereinabove for the pair of key pegs 1165b/pair of peg holes 1164b. Other variations may also be utilized, as long as a quantity of key pegs 1165b on the custom spanner wrench 1165 are configured to engage with a complementary quantity of peg holes 1164b within/on the access plug 1164, to enable selective removal of the access plug 1164 from the panel frame body, as necessary.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A compression framing system configured to engage with opposing mounting surfaces of a building opening, the compression framing system having at least one compression frame, each compression frame comprising:
    a first compression arm and a second compression arm, each compression arm having:
        a hollow pipe body having an inner body end and an outer body end;
        a connection bracket secured to the hollow pipe body; and
        a friction shoe configured to engage with the outer body end of the hollow pipe body, the friction shoe being further configured to engage directly with a corresponding opposing mounting surface of the opposing mounting surfaces;
    an inner support beam configured to be at least partially nested within the inner body end of the first compression arm and the inner body end of the second compression arm to secure the first compression arm to the second compression arm;
    a security glass frame configured to engage with each connection bracket, the security glass frame comprising:
        a panel frame body;
        a clamp ring configured to engage with the panel frame body; and
        a security panel configured to be engaged with both the panel frame body and the clamp ring, such that the security panel is securely compressed between the panel frame body and the clamp ring; and
    an expansion controller associated with the hollow pipe body of the first compression arm;
    wherein the expansion controller is configured to selectively adjust a separation distance between the friction shoe of the first compression arm and the friction shoe of the second compression arm.

2. The compression framing system of claim 1, wherein the building opening is an opening for a window, the security glass frame further comprising:
    an access plug nested within the panel frame body, wherein the access plug is configured to be selectively removed from the panel frame body to allow for manipulation of a corresponding compression frame of the at least one compression frame;
    wherein the protective structure is the security glass frame.

3. The compression framing system of claim 1, wherein each friction shoe is pivotally engaged with a corresponding hollow pipe body.

4. The compression framing system of claim 1, further comprising an expansion seal configured to engage with the first compression arm and the second compression arm, such that the expansion seal surrounds and conceals a middle gap formed between the first compression arm and the second compression arm.

5. The compression framing system of claim 1, wherein each friction shoe is comprised of silicon carbide.

6. The compression framing system of claim 1, wherein each friction shoe is comprised of two friction shoe blocks and two covers, wherein each friction shoe block of the two friction shoe blocks is configured to engage with a corresponding cover of the two covers and each cover is configured to improve engagement between the corresponding compression frame and the opposing mounting surface.

7. The compression framing system of claim 1, wherein the expansion controller is comprised of a keyed spindle partially nested within the hollow pipe body of the first compression arm, a worm drive engaged with the keyed spindle and nested within the hollow pipe body of the first compression arm, and a threaded rod configured to engage with the worm drive and nested within the hollow pipe body of the first compression arm, wherein the threaded rod is further configured to engage with the inner support beam, such that rotation of the keyed spindle is configured to extend the corresponding inner support beam away and the corresponding second compression arm away from the first compression arm.

8. A compression framing system configured to engage with opposing mounting surfaces of a building opening, the compression framing system having at least one compression frame, each compression frame comprising:
    a first compression arm and a second compression arm, each compression arm having:
        a hollow pipe body;
        a connection bracket secured to the hollow pipe body; and
        a friction shoe configured to pivotally engage with the hollow pipe body, the friction shoe being further configured to engage directly with a corresponding opposing mounting surface of the opposing mounting surfaces,
        wherein the pivotal engagement of the friction shoe with the hollow pipe body allows the friction shoe to be selectively rotated, the friction shoe comprising two friction shoe blocks and two covers, wherein each friction shoe block of the two friction shoe blocks is configured to engage with a corresponding cover of the two covers and each cover is configured to improve engagement between the corresponding compression frame and the opposing mounting surface;

an inner support beam configured to secure the first compression arm to the second compression arm; and an expansion controller associated with the hollow pipe body of the first compression arm;

wherein the expansion controller is configured to selectively adjust a separation distance between the friction shoe of the first compression arm and the friction shoe of the second compression arm.

9. The compression framing system of claim 8, each compression arm further comprising: a swivel plate configured to engage with the friction shoe and a swivel screw configured to pivotally engage the swivel plate with the corresponding hollow pipe body.

10. The compression framing system of claim 8, wherein the pivotal engagement of each friction shoe with the corresponding hollow pipe body allows each friction shoe to be selectively rotated to be parallel with a corresponding opposing mounting surface.

11. The compression framing system of claim 8, wherein the friction shoe is comprised of silicon carbide.

12. A compression framing system configured to engage with opposing mounting surfaces of a building opening, the compression framing system having at least one compression frame, each compression frame comprising:

a first compression arm and a second compression arm, each compression arm having:
 a hollow pipe body; and
 a friction shoe associated with the hollow pipe body, the friction shoe being configured to engage directly with a corresponding opposing mounting surface of the opposing mounting surfaces;

an inner support beam configured to secure the first compression arm to the second compression arm; and an expansion controller associated with the hollow pipe body of the first compression arm, the expansion controller comprising a keyed spindle partially nested within the hollow pipe body of the first compression arm and a worm drive engaged with the keyed spindle and nested within the hollow pipe body of the first compression arm;

wherein the expansion controller is configured to selectively adjust a separation distance between the friction shoe of the first compression arm and the friction shoe of the second compression arm.

13. The compression framing system of claim 12, further comprising an expansion seal configured to engage with the first compression arm and the second compression arm, such that the expansion seal surrounds and conceals a middle gap formed between the first compression arm and the second compression arm.

14. The compression framing system of claim 12, wherein the compression framing system is comprised of two compression frames, wherein a first compression frame is configured to be parallel with a second compression frame upon engagement of the compression framing system with the opposing mounting surfaces.

15. The compression framing system of claim 12, wherein each friction shoe is comprised of two friction shoe blocks and two covers, wherein each of the two friction shoe blocks are configured to engage with a corresponding cover of the two covers and each cover is configured to improve engagement between the compression frame and the corresponding opposing mounting surface.

16. The compression framing system of claim 15, wherein each friction shoe block is comprised of rubber.

17. The compression framing system of claim 12, further comprising a corresponding connection bracket secured to each compression arm and a security glass frame configured to engage with each connection bracket, the security glass frame comprising:

a panel frame body;

a clamp ring configured to engage with the panel frame body;

an access plug nested within the panel frame body, wherein the access plug is configured to be selectively removed from the panel frame body to allow for manipulation of a corresponding compression frame of the at least one compression frame; and a security panel configured to be engaged with both the panel frame body and the clamp ring, such that the security panel is securely compressed between the panel frame body and the clamp ring.

18. The compression framing system of claim 12, wherein the keyed spindle is configured to selectively extend the second compression arm away from the first compression arm to selectively increase an expansion force exerted on the opposing mounting surfaces.

19. The compression framing system of claim 12, wherein the building opening is an opening for a window and the protective structure is a security glass frame.

* * * * *